US012585568B2

(12) United States Patent
Levit-Gurevich et al.

(10) Patent No.: US 12,585,568 B2
(45) Date of Patent: Mar. 24, 2026

(54) METHODS AND APPARATUS TO PERFORM INSTRUCTION-LEVEL GRAPHICS PROCESSING UNIT (GPU) PROFILING BASED ON BINARY INSTRUMENTATION

(71) Applicant: Intel Corporation, Santa Clara, CA (US)

(72) Inventors: Konstantin Levit-Gurevich, Kiryat Byalik (IL); Aleksey Alekseev, Nyzhny Novgorod (RU); Michael Berezalsky, Tirat Carmel (IL); Sion Berkowits, Haifa (IL); Julia Fedorova, Nizhny Novgorod (RU); Anton V. Gorshkov, Nizhny Novgorod (RU); Sunpyo Hong, Framingham, MA (US); Noam Itzhaki, Yokneam Elit (IL); Arik Narkis, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/316,866

(22) Filed: May 12, 2023

(65) Prior Publication Data

US 2023/0281104 A1 Sep. 7, 2023

Related U.S. Application Data

(63) Continuation of application No. 15/806,917, filed on Nov. 8, 2017, now Pat. No. 11,650,902.

(51) Int. Cl.
| | |
|---|---|
| *G06F 11/3604* | (2025.01) |
| *G06F 8/41* | (2018.01) |
| *G06F 11/30* | (2006.01) |
| *G06F 11/34* | (2006.01) |

(52) U.S. Cl.
CPC ...... *G06F 11/3612* (2013.01); *G06F 11/3024* (2013.01); *G06F 11/3409* (2013.01); *G06F 11/3466* (2013.01); *G06F 8/41* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 7,890,941 B1 | 2/2011 | Garud et al. | |
| 8,141,066 B2 | 3/2012 | Chatterjee et al. | |
| 9,898,385 B1 * | 2/2018 | O'Dowd | ............ G06F 11/3664 |
| 11,650,902 B2 | 5/2023 | Levit-Gurevich et al. | |
| 2009/0293051 A1 * | 11/2009 | Krywaniuk | ............ G06F 8/658 717/173 |

(Continued)

OTHER PUBLICATIONS

Kambadur , "Fast Computational GPU Design with GT-Pin", IEEE (Year: 2015).*

United States Patent and Trademark Office, "Non-Final Office Action," issued in connection with U.S. Appl. No. 15/806,917, mailed on Oct. 31, 2019, 13 pages.

United States Patent and Trademark Office, "Final Office Action," issued in connection with U.S. Appl. No. 15/806,917, mailed on Jun. 12, 2020, 14 pages.

(Continued)

*Primary Examiner* — Wynuel S Aquino

(74) *Attorney, Agent, or Firm* — Hanley, Flight & Zimmerman, LLC

(57) ABSTRACT

Disclosed examples include generating instrumented code by inserting profiling instructions at insertion points in code; outputting the instrumented code for execution by second programmable circuitry; and accessing profiling data generated by the second programmable circuitry based on the instrumented code.

20 Claims, 9 Drawing Sheets

(56) References Cited

U.S. PATENT DOCUMENTS

| | | | |
|---|---|---|---|
| 2011/0050713 | A1 | 3/2011 | McCrary et al. |
| 2014/0012963 | A1 | 1/2014 | Swenson et al. |
| 2014/0281376 | A1 | 9/2014 | Yamada et al. |
| 2014/0281434 | A1* | 9/2014 | Madriles ............. G06F 9/30076 712/227 |
| 2015/0378868 | A1 | 12/2015 | Levit-Gurevich et al. |
| 2016/0070551 | A1 | 3/2016 | Miller et al. |
| 2016/0239408 | A1* | 8/2016 | Sule .................... G06F 11/3466 |
| 2016/0357703 | A1* | 12/2016 | Suzuki ............... G06F 12/0811 |
| 2017/0024305 | A1* | 1/2017 | Betser ................. G06F 11/3644 |
| 2017/0315847 | A1 | 11/2017 | Chen et al. |
| 2017/0371761 | A1* | 12/2017 | Piga ................... G06F 11/3604 |
| 2018/0322030 | A1* | 11/2018 | Davis ................. G06F 11/3624 |
| 2019/0146766 | A1* | 5/2019 | Sandanagobalane ........................ G06F 16/9024 717/157 |

OTHER PUBLICATIONS

United States Patent and Trademark Office, "Notice of Allowance and Fee(s) Due," issued in connection with U.S. Appl. No. 15/806,917, mailed on Jan. 5, 2023, 7 pages.

United States Patent and Trademark Office, "Decision on Appeal," issued in connection with U.S. Appl. No. 15/806,917, mailed on Sep. 30, 2022, 7 pages.

Sandanagobalane et al., "Specification of U.S. Appl. No. 62/569,380," filed Oct. 6, 2017, 24 pages.

Kambadur et al., "Fast Computational GPU Design with GT-Pin," IEEE International Symposium on Workload Characterization, 2015, 11 pages.

The Khronos Group, Inc., "clGetEventProfilingInfo," 2007-2009, retrieved from https://www.khronos.org/registry/OpenCL/sdk/1.0/docs/man/xhtml/clGetEventProfilingInf, on Nov. 7, 2017, 3 pages.

Stephenson et al., "Flexible Software Profiling of GPU Architectures," Proceedings of the International Symposium on Computer Architecture (ISCA), Jun. 13-17, 2015, 13 pages.

* cited by examiner

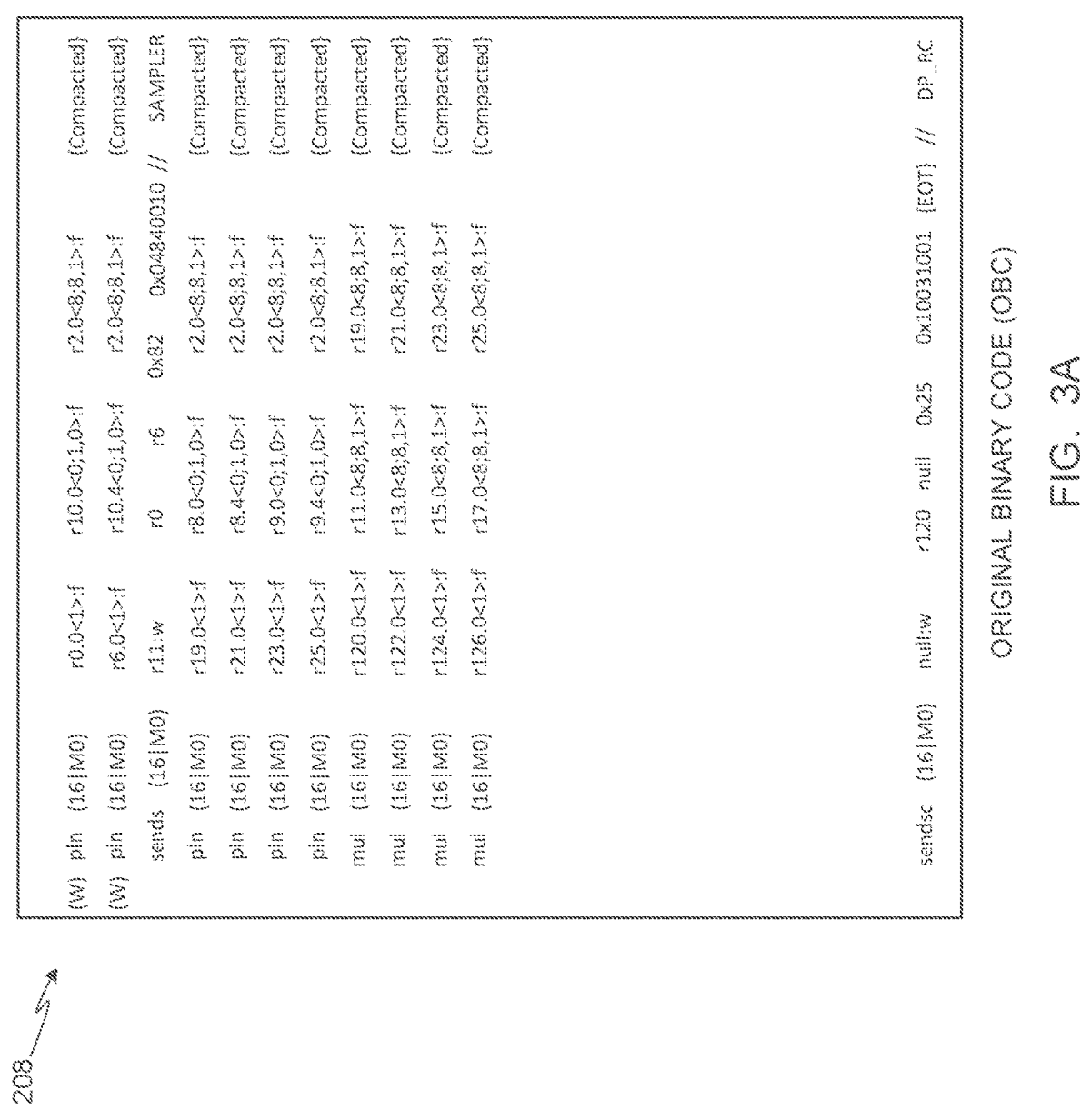

208

```
(W)  pin  (16|M0)    r0.0<1>:f    r10.0<0;1,0>:f    r2.0<8,8,1>:f    {Compacted}
(W)  pin  (16|M0)    r6.0<1>:f    r10.4<0;1,0>:f    r2.0<8,8,1>:f    {Compacted}
     sends (16|M0)   r11.w        r0       r6       0x82   0x04840010 //  SAMPLER
     pin  (16|M0)    r19.0<1>:f   r8.0<0;1,0>:f     r2.0<8,8,1>:f    {Compacted}
     pin  (16|M0)    r21.0<1>:f   r8.4<0;1,0>:f     r2.0<8,8,1>:f    {Compacted}
     pin  (16|M0)    r23.0<1>:f   r9.0<0;1,0>:f     r2.0<8,8,1>:f    {Compacted}
     pin  (16|M0)    r25.0<1>:f   r9.4<0;1,0>:f     r2.0<8,8,1>:f    {Compacted}
     mul  (16|M0)    r120.0<1>:f  r11.0<8,8,1>:f    r19.0<8,8,1>:f   {Compacted}
     mul  (16|M0)    r122.0<1>:f  r13.0<8,8,1>:f    r21.0<8,8,1>:f   {Compacted}
     mul  (16|M0)    r124.0<1>:f  r15.0<8,8,1>:f    r23.0<8,8,1>:f   {Compacted}
     mul  (16|M0)    r126.0<1>:f  r17.0<8,8,1>:f    r25.0<8,8,1>:f   {Compacted} sendsc  (16|M0)   null:w    r120   null   0x25   0x1031001  {EOT} //  DP_RC
```

ORIGINAL BINARY CODE (OBC)

FIG. 3A

PERFORMANCE PROFILE GUI

METHODS AND APPARATUS TO PERFORM INSTRUCTION-LEVEL GRAPHICS PROCESSING UNIT (GPU) PROFILING BASED ON BINARY INSTRUMENTATION

RELATED APPLICATION

This patent arises from a continuation of U.S. patent application Ser. No. 15/806,917, filed on Nov. 8, 2017, (now U.S. Pat. No. 11,650,902) and entitled "METHODS AND APPARATUS TO PERFORM INSTRUCTION-LEVEL GRAPHICS PROCESSING UNIT (GPU) PROFILING BASED ON BINARY INSTRUMENTATION, which is incorporated herein by reference in its entirety.

BACKGROUND

During a software development phase, a developer uses a number of tools to write and debug code. Sometimes a developer may desire to assess the performance of her code and identify places in which she can optimize the code for performance based on one or more performance characteristics. The developer may employ a performance profiling tool that collects performance data about the code as it is executed by a central processing unit (CPU). The tool may subsequently display the collected performance data to allow the developer to identify portions of the code to optimize.

BRIEF DESCRIPTION OF THE DRAWINGS

FIG. 3A is example original binary code (OBC) generated by the example GPU compiler of FIG. 2.

DETAILED DESCRIPTION

Figure 1:
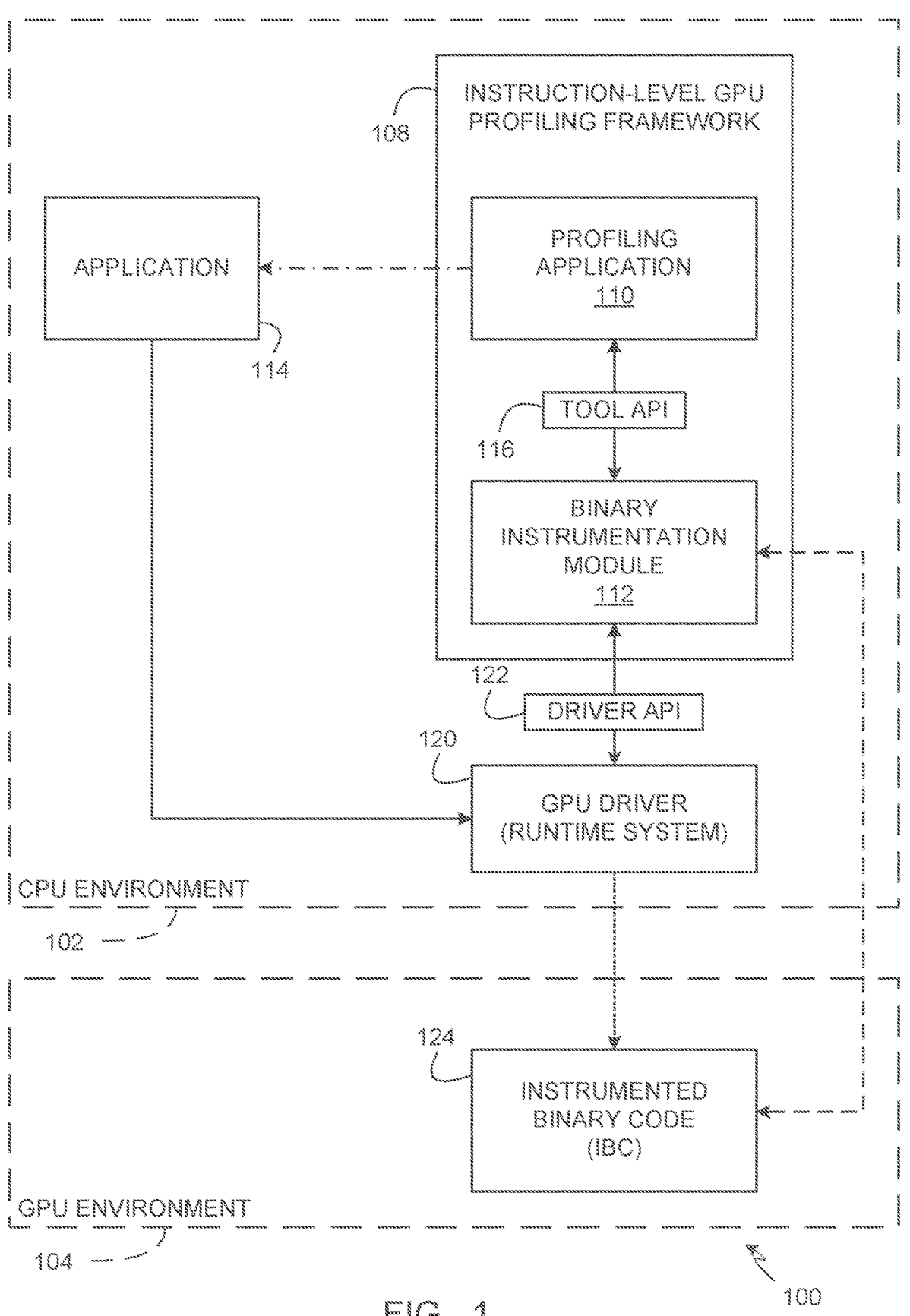
FIG. 1 is an example computing platform including an instruction-level graphics processing unit (GPU) profiling framework to perform instruction-level GPU profiling based on binary instrumentation.

Examples disclosed herein may be used to perform instruction-level graphics processing unit (GPU) profiling based on binary instrumentation of compiled object code. In this manner, examples disclosed herein may be used to monitor and assess low-level performance characteristics of graphics processing code (e.g., software and/or firmware) at the instruction level (e.g., at a per source code instruction level and/or at a machine instruction level). In examples disclosed herein, an example instruction-level GPU profiling framework is used in combination with a GPU driver to generate instrumented binary code by inserting profiling instructions in compiled GPU binary code. When the instrumented binary code is executed by execution units (EUs) of GPU hardware, the EUs generate profiling data based on the profiling instructions in the instrumented binary code, and store the generated profiling data in a memory. The generated profiling data represents instruction-level performance characteristics of the GPU binary code. A profiling application can then present the generated profiling data in a graphical user interface (GUI) of a display to show the performance characteristics of different portions of the GPU binary code.

Binary instrumentation technology is used to profile general purpose code executed by central processing units (CPUs). Such binary instrumentation technology is used for binary code profiling and analysis, performance analysis, trace generation, simulation, new instruction emulation, and other related purposes. Example binary instrumentation technologies for profiling such general-purpose code executed on CPUs are developed by Intel Corporation and include Intel® VTune™ Amplifier Performance Profiler, Intel® Inspector (Memory Checker and Thread Checker), Intel® Advisor, and others. However, CPU-based profiling techniques for general purpose code is not useable for profiling GPU-executed code.

Other binary instrumentation technologies which may be used to profile a GPU program are based on hardware performance counters in GPUs in combination with driver/runtime utility Application Programming Interfaces (APIs). In such techniques, the driver/runtime utility APIs define function calls that enable developer-access to such hardware performance counters. An example of such a GPU-based profiler is the Intel® Graphics Performance Analyzer (GPA). To use such binary instrumentation technologies to profile a GPU program, developers must modify their GPU source code to include the function calls from the driver/runtime utility APIs. For example, if a developer desires to measure the execution performance of a particular API-level graphics operation, the developer must add API-based function calls from a driver/runtime utility API at points in the source code suitable for measuring the performance of the graphics operation of interest. However, some embodiments of such GPU program profiling techniques based on hardware performance counters and corresponding API calls may result in coarse granularity of collected profiling data and may require modifying the source code based on API calls. That is, because the resulting profiling information is based on API-level calls and hardware performance counters, the resulting performance data is limited to the granularity of the entire kernel or the GPU program (e.g., a shader GPU program). For example, API-based profiling instructions used to access the hardware performance counters cannot be used to monitor execution performance at a lower level of granularity than high-level API calls that form the GPU program source code. Using such techniques, deeper, more granular insights at the per source code instruction level and/or into the machine instruction-level of the binary code cannot be captured. For example, performance insights (e.g., instruction latencies, control flow executions, instruction frequencies, hotspot detections, etc.) down to executions of specific machine instructions and/or basic blocks of machine instructions cannot be determined using such high-level API-based calls. Therefore, such techniques cannot be used to determine different machine instruction-level portions of graphics processes that contribute to high clock-cycle usage (e.g., code that runs "hot") and/or low clock-cycle usage (e.g., code that runs "cold"). Such techniques also cannot be used to determine the number of times different individual machine instructions and/or basic blocks of machine instructions have been executed.

Examples disclosed herein enable software/firmware developers to identify bottlenecks and detect hotspots in graphics applications (e.g., a DirectX API, an OpenGL API, a Metal API, etc.) and general purpose (GP) GPU compute applications (e.g., an OpenCL API, a CM API, etc.) and other low-level performance insights at machine-level instruction granularity which is a finer granularity than API-level profiling. Examples disclosed herein enable dynamic profiling of compiled binary code to be executed on the GPU EUs by using user-specified profiling configurations (e.g., in the form of instrumentation schemas). Such user-specified profiling configurations are used to insert profiling instructions at particular locations of the compiled binary code to generate instrumented binary code. When the instrumented binary code is executed by GPU EUs, the GPU EUs store performance data in memory to be subsequently displayed for viewing by a user (e.g., a developer). For example, techniques disclosed herein can be used to determine different machine instruction-level portions of graphics processes that contribute to high clock-cycle usage (e.g., code that runs "hot") and/or low clock-cycle usage (e.g., code that runs "cold"). Example techniques disclosed herein can also be used to determine the number of times different individual machine instructions and/or basic blocks of machine instructions have been executed. Examples disclosed herein may also be used to determine other types of instruction-level performance parameters such as counts of accesses to one or more memory locations, counts of accesses to one or more types of memory (e.g., video memory, local memory, system memory, mass storage, etc.), frequencies of executions of different instructions, etc.

Using examples disclosed herein, a user can perform performance analysis of graphics applications or GPGPU applications, and analyze the dynamic behavior of the code running on GPU EUs with finer granularity insights far beyond the coarser granularity performance measures achievable using hardware performance counters. Examples disclosed herein may be advantageously employed by hardware architects inside GPU design and manufacturing companies, and application developers. For example, hardware architects may employ examples disclosed herein for use in driver/compiler development and optimization (e.g., when developing GPU hardware and/or corresponding firmware and/or drivers), and application developers may employ examples disclosed herein to develop graphics applications and/or GPGPU applications.

FIG. 1 is an example computing platform 100 including an example instruction-level GPU profiling framework 108 (e.g., GPU profiling framework 100) to perform machine instruction-level GPU profiling and/or source code instruction-level GPU profiling based on inserting profiling instructions in target object code (e.g., object code to be measured or profiled for performance) using binary instrumentation. The computing platform 100 includes an example CPU environment 102 and an example GPU environment 104. In the example CPU environment 102, firmware and/or software programs are executed by a CPU (e.g., an Intel® x86 compatible processor and/or any other processor). In the example GPU environment 104, firmware and/or software programs are executed by a GPU (e.g., an Intel® HD graphics processor, an Intel® Iris graphics processor, and/or any other GPU). The example GPU profiling framework 108 includes an example profiling application 110 and an example binary instrumentation module 112.

In the illustrated example, the GPU profiling framework 108 is used to profile the GPU performance of one or more graphics processes (e.g., a graphics rendering operation, a graphics shader operation, a graphics compute kernel operation, etc.) of an application 114 that employs one or more graphics APIs (e.g., a DirectX API, an OpenCL API, a Metal Compute API, a Metal Graphics API, an OpenGL API, etc.). The application 114 of the illustrated example is coded in a high-level language (e.g., the C programming language, the C++ programming language, DirectX, OpenCL, Metal Compute, Metal Graphics, OpenGL, etc.) as a native application developed to run on the computing platform 100. Being a native application, the application 114 is designed to use features of an operating system and/or graphics software/libraries (e.g., the DirectX API, the OpenCL API, the Metal Compute API, the Metal Graphics API, the OpenGL API, etc.) installed on the computing platform 100.

In the illustrated example, the GPU profiling framework 108 may be used to instrument object code that was compiled based on source code of the one or more graphics processes of the application 114 to measure machine instruction-level performance of those graphics process(es) of the application 114. Such performance may be representative of the number of GPU clock cycles or the duration required to execute one or more machine instruction-level operations (e.g., one or more move instructions, one or more add instructions, one or more multiply instructions, one or more shift instructions, etc. and/or combinations thereof) of a graphics rendering operation, a graphics shader operation, a graphics compute kernel operation, etc. of the application 114. In the illustrated example, the application 114 need not be aware of the GPU profiling framework 108 and/or the binary instrumentation performed by the GPU profiling framework 108. As such, the application 114 executes in a normal execution mode without being aware of any underlying binary instrumentation being performed to measure its GPU-based performance. In some examples, the application 114 also includes CPU-based programming code that is targeted to run on a CPU in addition to GPU-based programming code that implements the one or more graphics processes for which GPU performance profiling is to be performed by the GPU profiling framework 108.

The example profiling application 110 provides a user interface (e.g., a GUI and/or a command line interface) to allow developers to specify performance measures that are to be collected based on binary instrumentation of target object code, and to display collected profiling data (e.g., performance measures) about the target object code for the developers. Unlike API-level performance profiling of Intel® VTune™ Amplifier Performance Profiler and/or the Intel® Graphics Performance Analyzer, the profiling application 110 enables users to specify performance parameters that are to be monitored at the instruction level (e.g., a source code instruction level and/or a machine instruction level). The binary instrumentation module 112 may be implemented using a binary instrumentation tool (e.g., the Intel® GT-PIN binary instrumentation tool for Intel® GPUs) that has been adapted to insert machine instructions into complied GPU object code in accordance with the teachings of this disclosure.

In the illustrated example, the profiling application 110 and the binary instrumentation module 112 communicate via a tool API 116. The example tool API 116 enables the profiling application 110 to provide user-specified performance profiling parameters to the binary instrumentation module 112 via high-level programming language statements (e.g., the C programming language, the C++ programming language, etc.) or in any other suitable form (e.g., plain text, tabular form, extensible markup language (XML), etc.). For example, a user may analyze the application 114 to identify aspects of the application 114 for which the user wishes to acquire performance profiling data. In the illustrated example, the user-specified performance profiling parameters provided by users via the profiling application 110 are used by the profiling application 110 to configure and control the binary instrumentation module 112 by instructing it on the types of machine instruction-level instrumentations to be used and locations in the target object code at which the instrumentations should be made. In some examples, the profiling application 110 can analyze the application 114 automatically without manual user analysis of the application 114. In this manner, the profiling application 110 can operate in an automated manner to review programming statements, function calls, and sub-routines in the application 114 to identify aspects of the code that should be profiled for performance analysis.

In the illustrated example, the binary instrumentation module 112 is in communication with an example GPU driver 120 via a driver API 122. The example GPU driver 120 provides the binary instrumentation module 112 with compiled binary object code corresponding to the application 114. In this manner, the binary instrumentation module 112 can instrument the binary object code with profiling instructions at the machine instruction level. Operations of the GPU driver 120 are discussed in more detail below in connection with FIG. 2. Although the GPU driver 120 is shown in the example of FIG. 1, in other examples, a runtime system API may be used instead of the GPU driver 120 to communicate with the binary instrumentation module 112.

In the illustrated example, resulting example instrumented binary code 124 generated by the binary instrumentation module 112 is provided to a GPU hardware device (e.g., the GPU hardware device 204 of FIG. 2) instead of the original binary code of the application 114 so that EUs of the GPU hardware device can execute the instrumented binary code 124 in the GPU environment 104 instead of the original binary code. In the illustrated example, the instrumented binary code 124 includes one or more instrumented renderers, one or more instrumented shaders, one or more instrumented compute kernels, and/or any other types of instrumented graphics operations or sub-routines. While executed on GPU EUs, profiling data generated based on instrumented profiling instructions inserted by the binary instrumentation module 112 in the instrumented binary code 124 is collected. In the illustrated example, the binary instrumentation module 112 is configured to have interactive communication with GPU environment 104 in which the instrumented binary code 124 is executed so that the binary instrumentation module 112 can dynamically retrieve the generated profiling data in real time during execution of the instrumented binary code 124. In the illustrated example, the binary instrumentation module 112 provides the generated profiling data to the profiling application 110 for further processing and analysis. The processed results are then presented to the user via a graphical user interface. In the illustrated example, since the binary instrumentation module 112 inserts profiling instructions in the instrumented binary code 124 at the machine instruction level, the resulting profiling data is generated at the granularity of individual EUs and corresponding hardware threads.

In the illustrated example, the GPU profiling framework 108, the GPU driver 120, the driver API 122, and the instrumented binary code 124 run on the same processor system. However, in other applications, the GPU profiling framework 108 runs on a separate processor system than the GPU driver 120, the driver API 122, and the instrumented binary code 124. Further details of the profiling application 110, the binary instrumentation module 112, and the GPU driver 120 are described in greater detail below in communication with FIG. 2.

Figure 2:
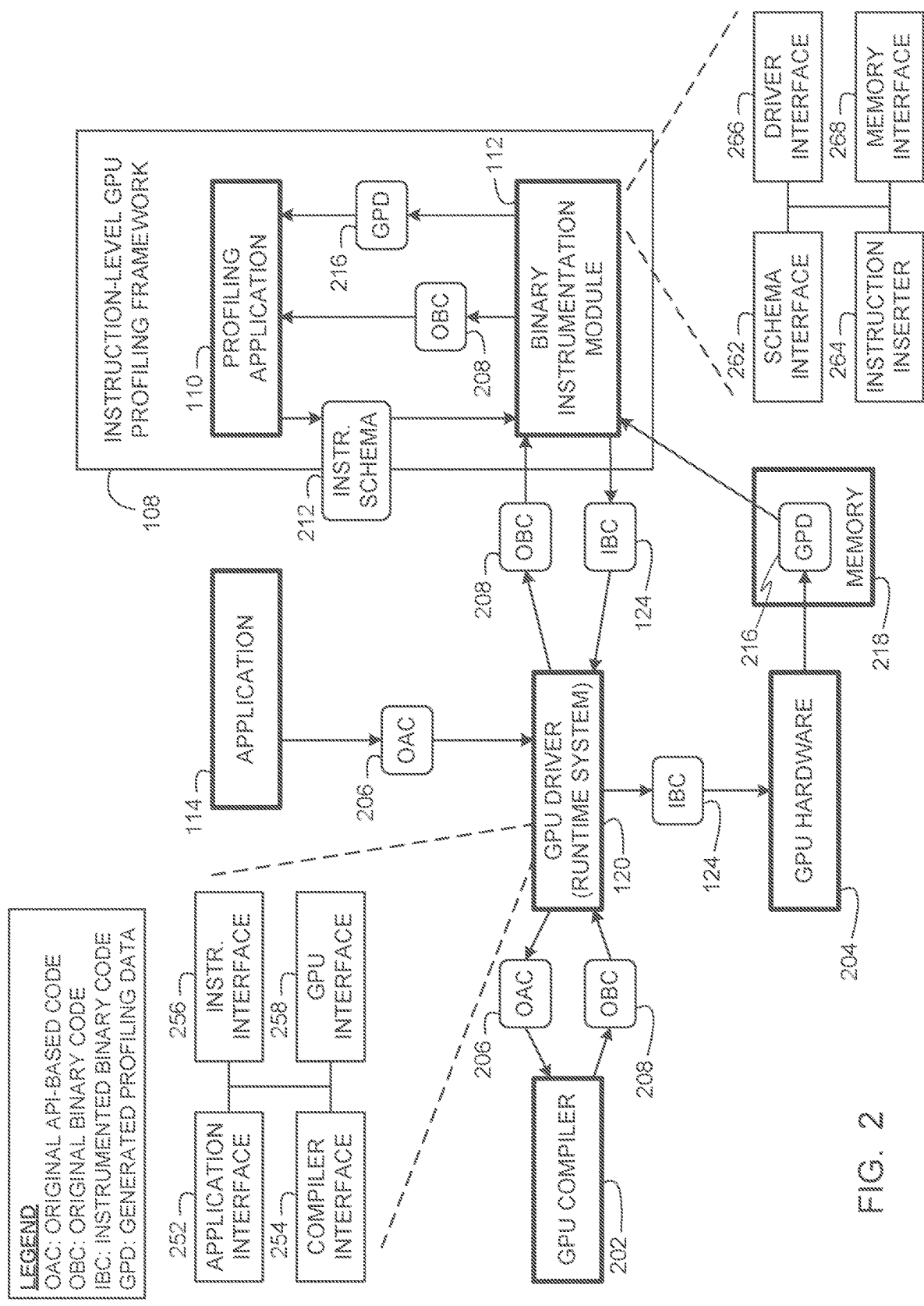
FIG. 2 is a flow diagram showing the example GPU driver of FIG. 1 in communication with the example instruction-level GPU profiling framework of FIG. 1 to perform instruction-level GPU profiling based on binary instrumentation.

FIG. 2 is a flow diagram showing the example GPU driver 120 of FIG. 1 in communication with the example instruction-level GPU profiling framework 108 of FIG. 1 to perform instruction-level GPU profiling based on binary instrumentation. In the illustrated example, the GPU driver 120 is in communication with the example application 114, the example binary instrumentation module 112, an example GPU compiler 202, and an example GPU hardware device 204. The example application 114 represents an original non-instrumented application that includes original API-based code (OAC) 206 (e.g., for implementing a graphics renderer, a graphics shader, a graphics compute kernel, etc.). The application 114 communicates with the corresponding GPU driver 120 (or a runtime system API) as defined by the specific graphics API interface(s) (e.g., a DirectX API, an OpenCL API, a Metal Compute API, a Metal Graphics API, an OpenGL API, etc.) used to develop the application 114. The example GPU driver 120 receives the OAC 206 (e.g., in the form of a file) and provides it to the GPU compiler 202. For example, the OAC 206 may include a flag or value in a header (e.g., a file header) from which the GPU driver 120 can determine that it is non-instrumented source code needing to be compiled.

The example GPU compiler 202 is a graphics processor compiler that compiles source code such as the OAC 206 to object code based on a target instruction set architecture (ISA) for execution by a target GPU device such as the GPU hardware device 204. In some examples, the example GPU compiler 202 may be implemented as a just-in-time (JIT) compiler that compiles source code (e.g., the OAC 206) during runtime in just-in-time fashion before execution by, for example, the GPU hardware device 204. In the illustrated example of FIG. 2, the GPU compiler 202 receives and compiles the OAC 206 to generate example original binary code (OBC) 208 (e.g., in the form of a file). In the illustrated example, the GPU compiler 202 is separate from the binary instrumentation module 112. As such, the GPU compiler 202 of the illustrated example does not instrument the OBC 208 with profiling instructions. However, in other examples, the binary instrumentation module 112 may be implemented as part of the GPU compiler 202. After the OAC 206 is compiled, the resulting OBC 208 is in form for execution by the GPU hardware device 204. The example GPU hardware device 204 may be implemented using an Intel® HD graphics processor, an Intel® Iris graphics processor, and/or any other GPU.

Figure 3B:
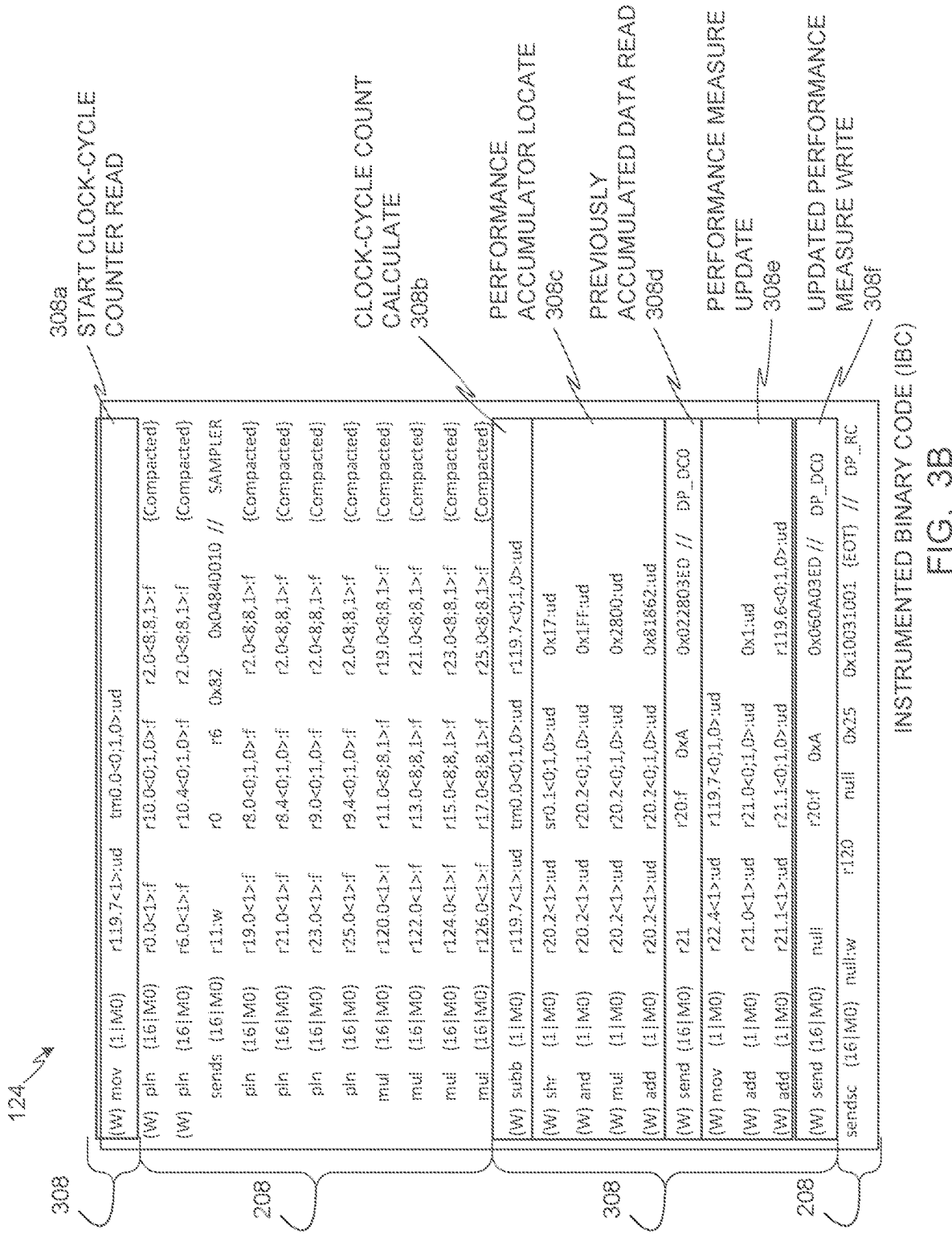
FIG. 3B is example instrumented binary code (IBC) that includes original binary code (OBC) and inserted profiling instructions.

Since the example application 114 is not provided with instrumentation/profiling instructions, the OAC 206 and the OBC 208 resulting from the application 114 of the illustrated example are referred to as original code because they are not instrumented with profiling instructions that could be used to measure execution performance when the OBC 208 is executed by the GPU hardware device 204. That is, the example application 114 includes software or firmware source code implemented using programming statements, function calls, subroutines, etc. in a high-level language in the original non-instrumented form such as the precompiled OAC 206. However, compilation of the OAC 206 by the GPU complier 202 generates a binary machine instruction-level representation of the application 114 in the form of the OBC 208 that causes the GPU hardware device 202 to execute the programming statements, function calls, subroutines, etc. programmed in the application 114. An example of the OBC 208 is shown in FIG. 3A as lines of code that include programming statements in assembly language representative of machine instructions corresponding to the OAC 206 of FIG. 2. The example OBC 208 shown in FIG. 3A is a DirectX-based shader that was compiled using an Intel® GPU compiler. However, examples disclosed herein may be used to instrument compiled binary code (e.g., the OBC 208) to generate instrumented binary code (e.g., the IBC 124 shown by way of example in FIG. 3B) for any other graphics API and/or compiled using any other suitable compiler.

Referring again to FIG. 2, in examples disclosed herein, instead of providing the OBC 208 to the GPU hardware device 204 for execution, the GPU driver 120 is configured to reroute the OBC 208 to the binary instrumentation module 112 so that the binary instrumentation module 112 can instrument the OBC 208 for performance profiling by inserting machine instruction-level profiling instructions into the OBC 208 to generate the example IBC 124. For example, the GPU driver 120 may read a flag or value in header information (e.g., a file header) of the OBC 208 indicating that the OBC 208 is non-instrumented object code. Based on the header information, the GPU driver 120 may determine that it should provide the OBC 208 to the binary instrumentation module 112 so that the binary instrumentation module 112 can instrument it with profiling instructions. Turning briefly to FIG. 3B, an example of the IBC 124 is shown as lines of code that include programming statements in assembly language representative of machine instructions corresponding to the OBC 208 of FIG. 2 and corresponding to instrumented profiling instructions 308 inserted by the binary instrumentation module 112. In the illustrated example, the OBC 208 corresponds to a graphics shader routine, and the instrumented profiling instructions 308 measure performance parameters corresponding to execution of the graphics shader routine.

The graphics shader routine of the OBC 208 shown in FIGS. 3A and 3B can be executed by the GPU hardware device 204 using multiple hardware threads of one or more EUs of one or more sub-slices of one or more slices of the GPU hardware device 204. That is, the GPU hardware device 204 includes multiple slices of hardware that operate to execute multiple graphics routines in parallel for high-performance graphics applications. Each slice of the GPU hardware device 204 includes multiple sub-slices of hardware, each sub-slice of hardware includes multiple EUs, and each EU can execute multiple hardware threads. At the slice level, a slice includes hardware (e.g., layer-3 cache, shared local memory) that is shared by its multiple sub-slices, and each sub-slice includes additional hardware (e.g., texture sampler, layer-1 and layer-2 texture caches, general memory interface) that is shared by its EUs. Each EU can run one or more hardware threads. Using examples disclosed herein, by instrumenting the OBC 208 with machine instruction-level profiling instructions, performance parameters may be measured down to the slice level, the sub-slice level, the EU level, and/or the hardware thread level. For example, the OBC 208 may be instrumented to measure the number of clock cycles used to execute the graphics shader routines at any one or more of these levels and/or the number of times one or more of these levels was employed by the GPU hardware device 204 to execute one or more invocations of the graphics shader routine. In some examples, the graphics shader routine is invoked multiple times to render graphics across one or more frame buffers. In such examples, performance parameters such as GPU clock cycles and instruction invocation counts may be measured for each execution of the graphics shader routine and/or may be totaled across all of the executions of the graphics shader routine for one or more frame buffer renderings.

In the illustrated example of FIG. 3B, performance parameters measured by the instrumented profiling instructions 308 include an invocation count and clock cycles count. The invocation count is indicative of a number of times the graphics shader routine is invoked, and the clock cycles count is indicative of an accumulated number of GPU clock cycles used per hardware thread to execute the graphics shader routine across all the times it was invoked. For example, FIG. 3B shows a start clock-cycle counter read instruction 308a that is part of the instrumented profiling instructions 308 and that reads (e.g., via a move (mov) instruction) a starting clock-cycle counter value before beginning execution of the graphics shader. An example clock-cycle count calculate instruction 308b (e.g., implemented using a subtraction instruction) reads an ending clock-cycle counter value after the graphics shader is finished executing and determines the number of clock cycles used by the shader based on a difference between the starting and ending clock-cycle counter values.

Example performance accumulator locate instructions 308c compute an address in a memory buffer corresponding to a location in memory (e.g., the memory 218 of FIG. 2) at which accumulated values of the measured performance parameters are being stored during a graphics process that invokes the graphics shader routine of the OBC 208. In the illustrated example, the performance parameters are measured at the hardware thread level. As such, the performance accumulator locate instructions 308c compute an address in a memory buffer that corresponds to a particular hardware thread (that executed the most recently measured invocation of the graphics shader routine) of a particular EU in a particular sub-slice of a particular slice of the GPU hardware device 204. After the address in the memory buffer is found, an example previously accumulated data read instruction 308d reads an accumulated clock cycle count. In the illustrated example, the accumulated clock cycle count reflects the total GPU clock cycles used by all the invocations of the graphics shader routine executed by the particular hardware thread while executing the IBC 124.

Example performance measure update instructions 308e update the accumulated total invocation count for the instructions of the OBC 208 and update the accumulated clock cycle count obtained by the previously accumulated data read instruction 308d. For example, the performance measure update instructions 308e increments an accumulated total invocation count stored at the memory location calculated by the performance accumulator locate instructions 308c. In addition, the example performance measure update instructions 308e update the accumulated clock cycle count by summing the accumulated clock cycle count (e.g., retrieved with the previously accumulated data read instruction 308*d*) with the recently calculated clock cycle count (e.g., calculated based on values from the start instruction-cycle counter read instruction 308*a* and the instruction-cycle counter calculate instruction 308*b*). An example updated performance measure write instruction 308*f* then writes the resulting sum value as the updated performance measure in the same memory location calculated by the performance accumulator locate instructions 308*c*.

Returning to the illustrated example of FIG. 2, the binary instrumentation process of the binary instrumentation module 112 is driven by the profiling application 110, which receives the OBC 208 from the binary instrumentation module 112 and generates an example instrumentation schema 212 to specify how to instrument the OBC 208 with profiling instructions. The example profiling application 110 communicates with the binary instrumentation module 112 via the instrumentation schema 212 to control how the binary instrumentation module 112 performs desired instrumentation of specified profiling instructions on the OBC 208. The example instrumentation schema 212 includes performance profiling parameters in high-level programing language statements (e.g., the C programming language, the C++ programming language, etc.) or in any other suitable form (e.g., plain text, tabular form, extensible markup language (XML), etc.). For example, a high-level API-based user-specified performance profiling parameter in the instrumentation schema 212 may instruct the binary instrumentation module 112 to insert profiling instructions at particular locations of target object code that measure different aspects of high-level graphics operations (e.g., different aspects of a graphics renderer, different aspects of a graphics shader, different aspects of a graphics compute kernel, etc.). The different aspects may include the performance of one or more move instructions, one or more add instructions, one or more multiply instructions, one or more shift instructions, etc. and/or any combination of machine instruction-level instructions that make up different portions of high-level graphics operations.

Example profiling instruction insertion statements generated by the profiling application 110 in the instrumentation schema 212 may specify specific profiling instructions to insert at different code locations in target code (e.g., the OBC 208) and/or may specify performance parameters to measure for different specified code sequences in target code. For example, instruction insertion statements may specify to add a time-stamp start read (or counter start read) profiling instruction at an instruction insertion point before machine instruction A and add a time-stamp end read (or counter end read) profiling instruction at an instruction insertion point after machine instruction B. In such example, machine instructions A and B refer to specific instructions in the OBC 208 that were identified by the profiling application 110 as inclusively bounding (e.g., start and end points) a code sequence to be profiled that includes the machine instructions A and B. In this manner, the resulting instrumentation of the OBC 208 with the time-stamp start/stop read (or counter start/stop read) profiling instructions added at corresponding instruction insertion points can be used to measure an execution duration (e.g., in a time unit of measure or in GPU clock cycles) of the bounded code sequence inclusive of the machine instructions A and B. Alternatively, an instruction insertion statement may specify to measure a particular performance parameter (e.g., an execution duration) for a code sequence bound by machine instructions A and B in the OBC 208. In such examples, the binary instrumentation module 112 may be provided with a profiling instruction look-up table or other type of instruction-reference guide that specifies what types of instructions to use for what types of performance parameters specified in the instrumentation schema 212 to be measured. For example, the profiling instruction look-up table or other type of profiling instruction-reference guide may indicate that an execution duration is measured by adding a time-stamp start read (or counter start read) profiling instruction at an instruction insertion point before a starting code sequence instruction (e.g., the machine instruction A) and add a time-stamp end read (or counter end read) profiling instruction at an instruction insertion point after an ending code sequence instruction (e.g., the machine instruction B).

In some examples, the profiling application 110 obtains from the GPU driver 120 a mapping of each machine instruction in the OBC 208 to its corresponding high-level instruction in the OAC 206 (e.g., of the application 114) from which that machine instruction was generated. In some examples, a single high-level instruction from the OAC 206 maps to multiple machine instructions that implement that single high-level instruction. In examples in which such machine-to-high-level instruction mapping is obtained, the mapping can be subsequently displayed in a profile performance view (e.g., an example performance profile GUI 400 of FIG. 4A) showing collected performance measures in association with both the high-level instruction source code (e.g., the OAC 206) and the corresponding low-level machine instructions (e.g., the OBC 208).

During the binary instrumentation process, the binary instrumentation module 112 obtains the performance profiling parameter settings or configurations from the instrumentation schema 212 to identify the types of profiling instructions to insert in the OBC 208 and locations in the OBC 208 at which to insert the profiling instructions to generate example instrumented binary code (IBC) 124 (e.g., as shown in the illustrated example of FIG. 3B). The example binary instrumentation module 112 provides the IBC 124 to the GPU driver 120, and the GPU driver 120, in turn, routes the IBC 124 to the GPU hardware device 204 for execution by GPU hardware device 204. For example, the GPU driver 120 may read a flag or value in header information of the IBC 124 indicating that the IBC 124 is instrumented binary code. The GPU driver 120 may determine, based on the header information, to route the IBC 124 to the GPU hardware device 204 for execution.

Since the IBC 124 of the illustrated example includes the original code of the OBC 208 and the instrumented profiling instructions inserted by the binary instrumentation module 112, when the GPU hardware device 204 executes the IBC 124, the IBC 124 causes the GPU hardware device 204 to perform the graphics operations programmed in the OBC 208 and also causes the GPU hardware device 204 to generate and collect profiling data based on the instrumented profiling instructions. In the illustrated example of FIG. 2, the collected profiling data is shown as example generated profiling data (GPD) 216. Since the instrumented profiling instructions are inserted at the machine instruction level, the IBC 124 causes the GPU hardware device 204 to generate the GPD 216 with fine granularity at the EU level and hardware thread level of the GPU hardware device 204. Based on the instrumented profiling instructions in the IBC 124, the GPU hardware device 204 stores the GPD 216 at one or more locations in memory 218 (e.g., one or more memory device(s) implemented by one or more of the local memory 613, the volatile memory 614, the nonvolatile memory 616, and/or the mass storage 628 of FIG. 6) specified by the instrumented profiling instructions. For example, the instrumented profiling instructions may cause the GPU hardware device 204 to allocate memory space in the memory 218 at which to store the GPD 216. Because the binary instrumentation module 112 provided those instrumented profiling instructions, the binary instrumentation module 112 is aware of the memory spaces allocated in the memory 218 at which the GPU hardware device 204 stores the GPD 216. In this manner, the binary instrumentation module 112 can subsequently retrieve the GPD 216 from those allocated memory spaces in the memory 218.

During execution of the IBC 124 or after completion of execution of the IBC 124 (e.g., during or after execution of a portion of the application 114, during or after a draw command, after completing processing of a command buffer, etc.), the profiling application 110 works with the binary instrumentation module 112 to retrieve and access the GPD 216 from the memory 218. In the illustrated example, the profiling application 110 displays performance measures based on the GPD 216 via a user interface (e.g., an example performance profile GUI 400 of FIG. 4A). In some examples, the profiling application 110 applies one or more different types of analyses to the GPD 216 and displays results of such analyses via a user interface. For example, some analyses may provide performance statistics analysis such as informing a user of the best performing machine instruction routines in the object code relative to other machine instruction routines in the same object code. Other analyses may inform a user of possible improvements to the code such as loop unrolling, memory use optimization, etc.

Figure 4A:
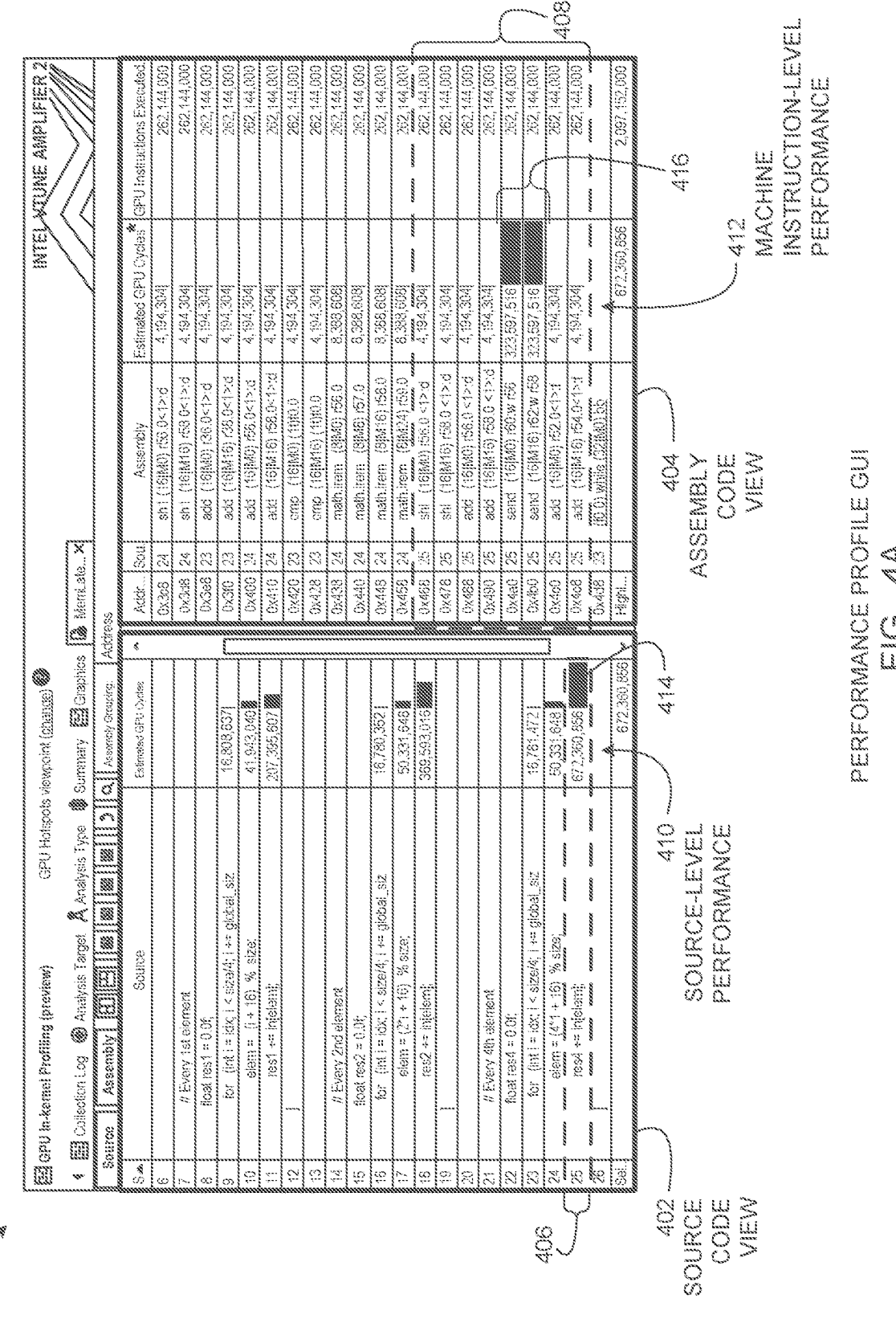
FIG. 4A is an example performance profile graphical user interface (GUI) showing example generated profiling data generated by the example instruction-level GPU profiling framework of FIGS. 1 and 2.

Turning briefly to FIG. 4A, the example performance profile GUI 400 includes a source code view 402 and an assembly code view 404. The source code view 402 shows source code programming statements (e.g., corresponding to the OAC 206 of FIG. 2) as coded by a developer in a high-level programming language. In the illustrated example, the source code in the source code view 402 is programmed in the C programming language using the OpenCL API. However, source code developed using any other programming language and/or graphics API may be employed in connection with examples disclosed herein. The assembly code view 404 shows low-level machine instructions of object code (e.g., the OBC 208 and/or the IBC 124 of FIG. 2) generated by the GPU compiler 202 and/or the binary instrumentation module 112 of FIG. 2 for execution by the GPU hardware device 204. The lines of code in the source code view 402 correspond to one or more lines of code in the assembly code view 404. For example, a line of source code 406 shown in the source code view 402 corresponds to eight lines of assembly code 408 shown in the assembly code view 404. The illustrated example shows that, when compiled (e.g., by the GPU compiler 202 of FIG. 2), each line of source code (programmed in a high-level programming language) may be implemented by a plurality of lines of machine instructions (e.g., to be executed by the GPU hardware device 204 of FIG. 2). Although a particular layout of the example performance profile GUI 400 is shown in FIG. 4A, FIG. 4A is merely an example of how information based on the GPD 216 may be displayed to a user. Such information may alternatively or additionally be displayed using other suitable layouts, formats, performance measurement units, etc. In addition, although the example performance profile GUI 400 is shown as implemented using an Intel® VTune™ Amplifier GUI, any other suitable GUI may be used to implement a performance profile GUI to display information based on the GPD 216.

The example performance profile GUI 400 of FIG. 4A also includes a source-level performance column 410 and a machine instruction-level performance column 412. The example source-level performance column 410 includes estimated GPU clock cycles used by the GPU hardware device 204 to execute corresponding lines of source code in the source code view 402. The example machine instruction-level performance column 412 includes estimated GPU clock cycles used by the GPU hardware device 204 to execute corresponding lines of machine instructions in the assembly code view 404. In the illustrated example of FIG. 4A, the line of source code 406 is shown as having been executed by the GPU hardware device 204 using 672,360, 856 GPU clock cycles. These same number of clock cycles are shown distributed across the corresponding eight lines of assembly code 408 shown in the assembly code view 404. For example, six of the eight lines of assembly code 408 were executed by the GPU hardware device 204 using 4,194,304 GPU clock cycles, and two of the eight lines of assembly code 408 were executed by the GPU hardware device 204 using 323,597,516 GPU clock cycles. Thus, the assembly code view 404 shows how the source code instruction-level performance shown in the source code view 402 is distributed across corresponding lower-level machine instructions. As such, examples disclosed herein may be used to measure instruction-level performance at the pre-compilation source code level and/or at the post-compilation machine instruction level.

In the illustrated example of FIG. 4A, the line of source code 406 is shown as a "hot" spot relative to other lines of source code because of its high clock-cycle usage (e.g., takes more time to perform than other lines of code). This "hot" spot is graphically indicated by a horizontal bar 414 that is relatively longer than other horizontal bars corresponding to the other lines of source code. Similarly, in the corresponding eight lines of assembly code 408, "hot" spots are graphically indicated for 'send' instructions using horizontal bars 416 that are relatively longer than other bars corresponding to other machine instructions. The longer horizontal bars 416 represent the "hot" spots as machine instructions that use relatively more (e.g., significantly more) clock cycles than other ones of the machine instructions (e.g., the 'send' instructions take more time to perform than the other machine instructions). The 'send' instructions correspond to memory reads. As such, the longer horizontal bars 416 shown in the machine instruction-level performance column 412 indicate that the memory reads implemented by the 'send' instructions are the major contributors to the high clock-cycle usage of the line of source code 406. A user may elect to optimize the source code shown in the source code view 402 to run faster (e.g., use less clock cycles) based on analyzing the "hot" spots shown in the source-level performance column 410 and the machine instruction-level performance column 412. For example, the user may improve the performance of the source code by rearranging a data structure allocated/initialized in memory that is accessed by the 'send' instructions to reduce the number of memory reads needing to be performed for the 'send' instructions. In this manner, the user can eliminate the bottleneck created by the corresponding memory reads performed for the 'send' instructions.

In the illustrated example, the profiling application 110 of FIG. 2 can perform a post-GPD collection analysis to determine the GPU clock cycles shown in the machine instruction-level performance column 412 for each of the eight lines of assembly code 408 based on the total GPU clock cycles shown in the source-level performance column 410 for the line of source code 406. For example, the GPU hardware device 204 of FIG. 2 may measure the GPU clock cycles used to perform all of the eight lines of assembly code 408 to implement the corresponding line of source code 406 by executing a start clock-cycle counter read instruction (e.g., the start clock-cycle counter read instruction 308a of FIG. 3B) before starting execution of the eight lines of assembly code 408, and by executing a clock-cycle count calculate instruction (e.g., the clock-cycle count calculate instruction 308b of FIG. 3B) after executing the eight lines of assembly code 408. The accumulated number of GPU clock cycles for all of the invocations of the eight lines of assembly code 408 can then be divided by the profiling application 110 across each of the eight lines of assembly code 408 identifying how many ones of the total GPU clock cycles were used by each of the eight lines of assembly code 408. For example, such subsequent analysis may be performed by the profiling application 110 as a post-GPD collection analysis based on a known number of GPU clock cycles consumed by each execution/invocation of each of the eight lines of assembly code 408.

Figure 4B:
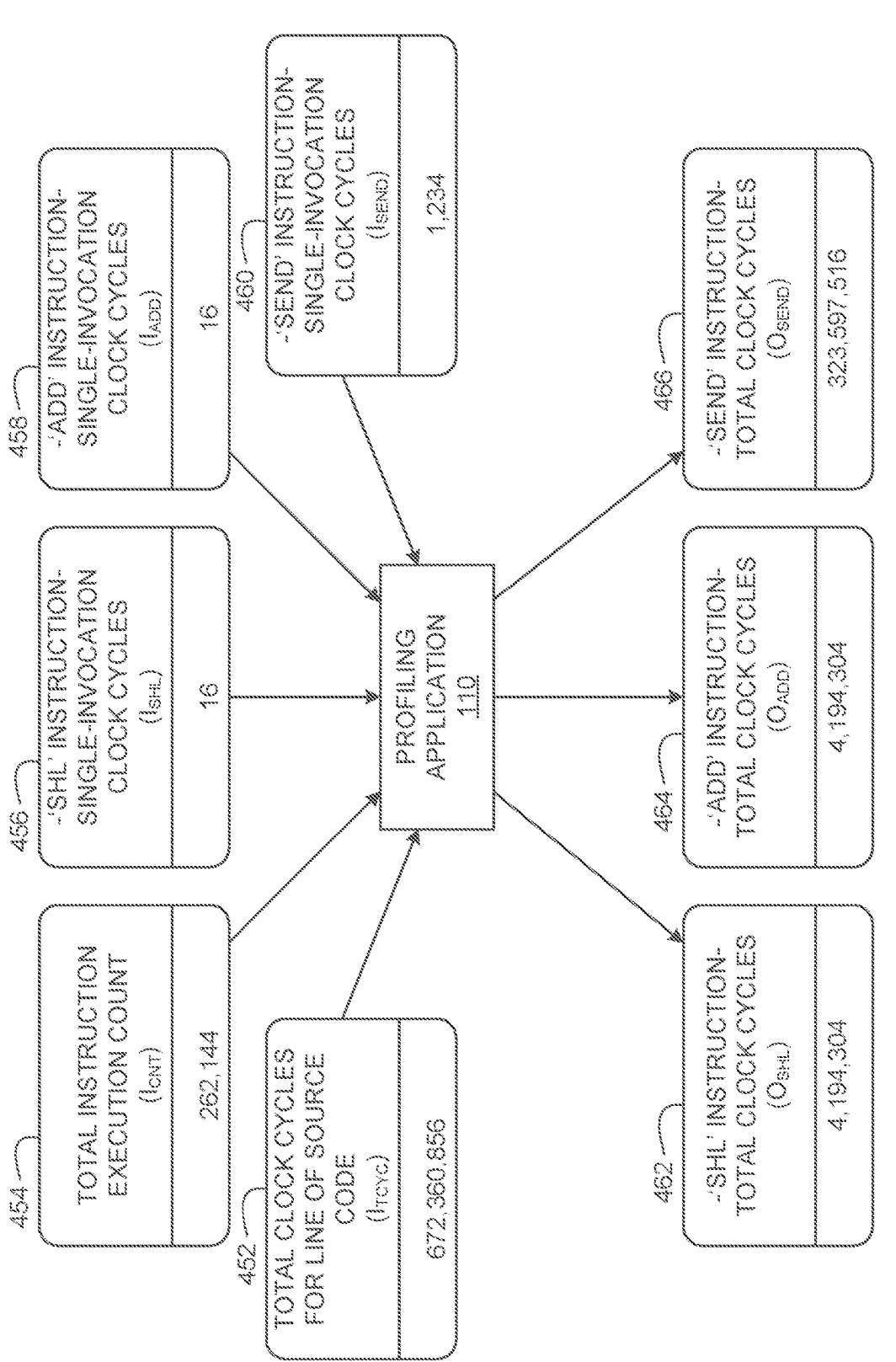
FIG. 4B is an example post-profiling data collection analysis that may be performed by the profiling application of FIGS. 1 and 2 to calculate machine instruction-level GPU clock cycles for corresponding lines of assembly code of FIG. 4A.

An example post-GPD collection analysis to calculate the machine instruction-level GPU clock cycles for each of the eight lines of assembly code 408 may be performed by the profiling application 110 as shown in FIG. 4B. In the illustrated example of FIG. 4B, the profiling application 110 accesses the GPD 216 to obtain a total GPU clock cycles for line of source code value ($I_{TCYC}$) 452 (e.g., GPU clock cycles=672,360,856) and a total instruction execution count value ($I_{CNT}$) 454 (e.g., total instruction execution count=262,144). In the illustrated example, the total GPU clock cycles for line of source code value ($I_{TCYC}$) 452 and the total instruction execution count value ($I_{CNT}$) 454 are generated by the GPU hardware device 204 when executing the IBC 124 based on instrumented profiling instructions (e.g., the instrumented profiling instructions 308 of FIG. 3B) in the IBC 124. For example, the total GPU clock cycles for line of source code value ($I_{TCYC}$) 452 is the total accumulated GPU clock cycles for all of the invocations of the eight lines of assembly code 408 of FIG. 4A, and the total instruction execution count value ($I_{CNT}$) 454 is the total number of times that the eight lines of assembly code 408 were executed. In some examples, an instrumented profiling instruction in the IBC 124 such as the performance measure update instruction 308e of FIG. 3B may be used to accumulate the total GPU clock cycles for line of source code value ($I_{TCYC}$) 452 and the total instruction execution count value ($I_{CNT}$) 454 during the executions of the eight lines of assembly code 408.

Also in the example of FIG. 4B, the profiling application 110 receives an 'SHL' (bit shift left) instruction single-invocation clock cycles value ($I_{SHL}$) 456 (e.g., 'SHL' single-invocation clock cycles=16), an 'ADD' instruction single-invocation clock cycles value ($I_{ADD}$) 458 (e.g., 'ADD' single-invocation clock cycles=16), and a 'SEND' instruction single-invocation clock cycles value ($I_{SEND}$) 460 (e.g., 'SEND' instruction single-invocation clock cycles=1,234). The example single-invocation clock cycles values ($I_{SHL}$) 456, ($I_{ADD}$) 458, ($I_{SEND}$) 460 are pre-defined for the corresponding instructions in a corresponding instruction set architecture (ISA). Such pre-defined cycles are estimated by designers when developing the ISA as the number of GPU clock cycles that will be used by the GPU hardware device 204 to execute each of the corresponding 'SHL', 'ADD', and 'SEND' instructions as part of fetch, decode, and execute phases of an instruction cycle.

In the illustrated example of FIG. 4B, the profiling application 110 processes the input values to determine how many of the total GPU clock cycles for line of source code value ($I_{TCYC}$) 452 are apportioned to each of the 'SHL' instructions, the 'ADD' instructions, and the 'SEND' instructions of the eight lines of assembly code 408 of FIG. 4A based on the total instruction execution count ($I_{CNT}$) 454, the 'SHL' instruction single-invocation clock cycles value ($I_{SHL}$) 456, the 'ADD' instruction single-invocation clock cycles value ($I_{ADD}$) 458, and the 'SEND' instruction single-invocation clock cycles value ($I_{SEND}$) 460. For example, the profiling application 110 can use Equation 1 below to determine that across 262,144 invocations (e.g., the total instruction execution count value ($I_{CNT}$) 454), each 'SHL' instruction of the eight lines of assembly code 408 used 4,194,304 total clock cycles.

$$\text{Total clock cycles per 'SHL' instruction} = I_{CNT} \times I_{SHL} \qquad \text{Equation 1}$$

Equation 1 above can be represented in numerical values as $4{,}194{,}304 = 262{,}144 \times 16$, where the total clock cycles per 'SHL' instruction is 4,194,304, the $I_{CNT}$ is 262,144, and the $I_{SHL}$ is 16. The total clock cycles for each 'ADD' instruction and each 'SEND' instruction of the eight lines of assembly code 408 can be determined in a similar way based on their respective single-invocation clock cycles (e.g., $I_{ADD}$ 458 and $I_{SEND}$ 460). The example profiling application 110 can then compare the sum of the total clock cycles per 'SHL' instruction, per 'ADD' instruction, and per 'SEND' instruction to the total GPU clock cycles for line of source code value ($I_{TCYC}$) 452 to confirm that the calculated total clock cycles for all of the invocations of the eight lines of assembly code 408 is consistent with the measured total GPU clock cycles for line of source code value ($I_{TCYC}$) 452.

Returning to the illustrated example of FIG. 2, the GPU driver 120 is provided with an example application interface 252, an example compiler interface 254, an example instrumentation interface 256, and an example GPU interface 258 to enable the GPU driver 120 to receive, arbitrate, and send ones of the OAC 206, OBC 208, and IBC 124 from and/or to ones of the example application 114, the example GPU compiler 202, the example GPU hardware device 204, and the example binary instrumentation module 112. The example GPU driver 120 is provided with the application interface 252 to receive the OAC 206 from the application 114. The example GPU driver 120 is provided with the compiler interface 254 to provide the OAC 206 to the GPU compiler 202 and to receive the OBC 208 from the GPU compiler 202. The example GPU driver 120 is provided with the instrumentation interface 256 to provide the OBC 208 to the binary instrumentation module 112 and to receive the IBC 124 from the binary instrumentation module 112. The example GPU driver 120 is provided with the GPU interface 258 to provide the IBC 124 to the GPU hardware device 204. Also in the illustrated example of FIG. 2, the binary instrumentation module 112 is provided with an example schema interface 262, an example instruction inserter 264, an example driver interface 266, and an example memory interface 268. The example binary instrumentation module 112 is provided with the schema interface 262 to receive the instrumentation schema 212 from the profiling application 110. The example binary instrumentation module 112 is provided with the instruction inserter 264 to insert profiling instructions (e.g., the instrumented profiling instructions 308 of FIG. 3B) in the OBC 208 to generate the IBC 124 (e.g., as shown in FIG. 3B). The example binary instrumentation module 112 is provided with the driver interface 266 to receive the OBC 208 from the GPU driver 120 and to provide the IBC 124 to the GPU driver 120. The example binary instrumentation module 112 is provided with the memory interface 268 to access the GPD 216 in the memory 218 and to provide the GPD 216 to the profiling application 110.

While an example manner of implementing the instruction-level GPU profiling framework 108 and the GPU driver 120 is illustrated in FIGS. 1 and 2, one or more of the elements, processes and/or devices illustrated in FIGS. 1 and 2 may be combined, divided, re-arranged, omitted, eliminated and/or implemented in any other way. Further, the example instruction-level GPU profiling framework 108, the example profiling application 110, the example binary instrumentation module 112, the example GPU driver 120, the example application 114, the example GPU compiler 202, the example GPU hardware 204, the example memory 218, the example application interface 252, the example compiler interface 254, the example instrumentation interface 256, the example GPU interface 258, the example schema interface 262, the example instruction inserter 264, the example driver interface 266, and/or the example memory interface 268 of FIG. 1 and/or FIG. 2 may be implemented by hardware, software, firmware and/or any combination of hardware, software and/or firmware. Thus, for example, any of the example instruction-level GPU profiling framework 108, the example profiling application 110, the example binary instrumentation module 112, the example GPU driver 120, the example application 114, the example GPU compiler 202, the example GPU hardware 204, the example memory 218, the example application interface 252, the example compiler interface 254, the example instrumentation interface 256, the example GPU interface 258, the example schema interface 262, the example instruction inserter 264, the example driver interface 266, and/or the example memory interface 268 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example instruction-level GPU profiling framework 108, the example profiling application 110, the example binary instrumentation module 112, the example GPU driver 120, the example application 114, the example GPU compiler 202, the example GPU hardware 204, the example memory 218, the example application interface 252, the example compiler interface 254, the example instrumentation interface 256, the example GPU interface 258, the example schema interface 262, the example instruction inserter 264, the example driver interface 266, and/or the example memory interface 268 is/are hereby expressly defined to include a non-transitory computer readable storage device or storage disk such as a memory, a digital versatile disk (DVD), a compact disk (CD), a Blu-ray disk, etc. including the software and/or firmware. Further still, the example instruction-level GPU profiling framework 108, the example profiling application 110, the example binary instrumentation module 112, the example GPU driver 120, the example application 114, the example GPU compiler 202, the example GPU hardware 204, the example memory 218, the example application interface 252, the example compiler interface 254, the example instrumentation interface 256, the example GPU interface 258, the example schema interface 262, the example instruction inserter 264, the example driver interface 266, and/or the example memory interface 268 may include one or more elements, processes and/or devices in addition to, or instead of, those illustrated in FIG. 1 and/or FIG. 2, and/or may include more than one of any or all of the illustrated elements, processes and devices.

Figure 6:
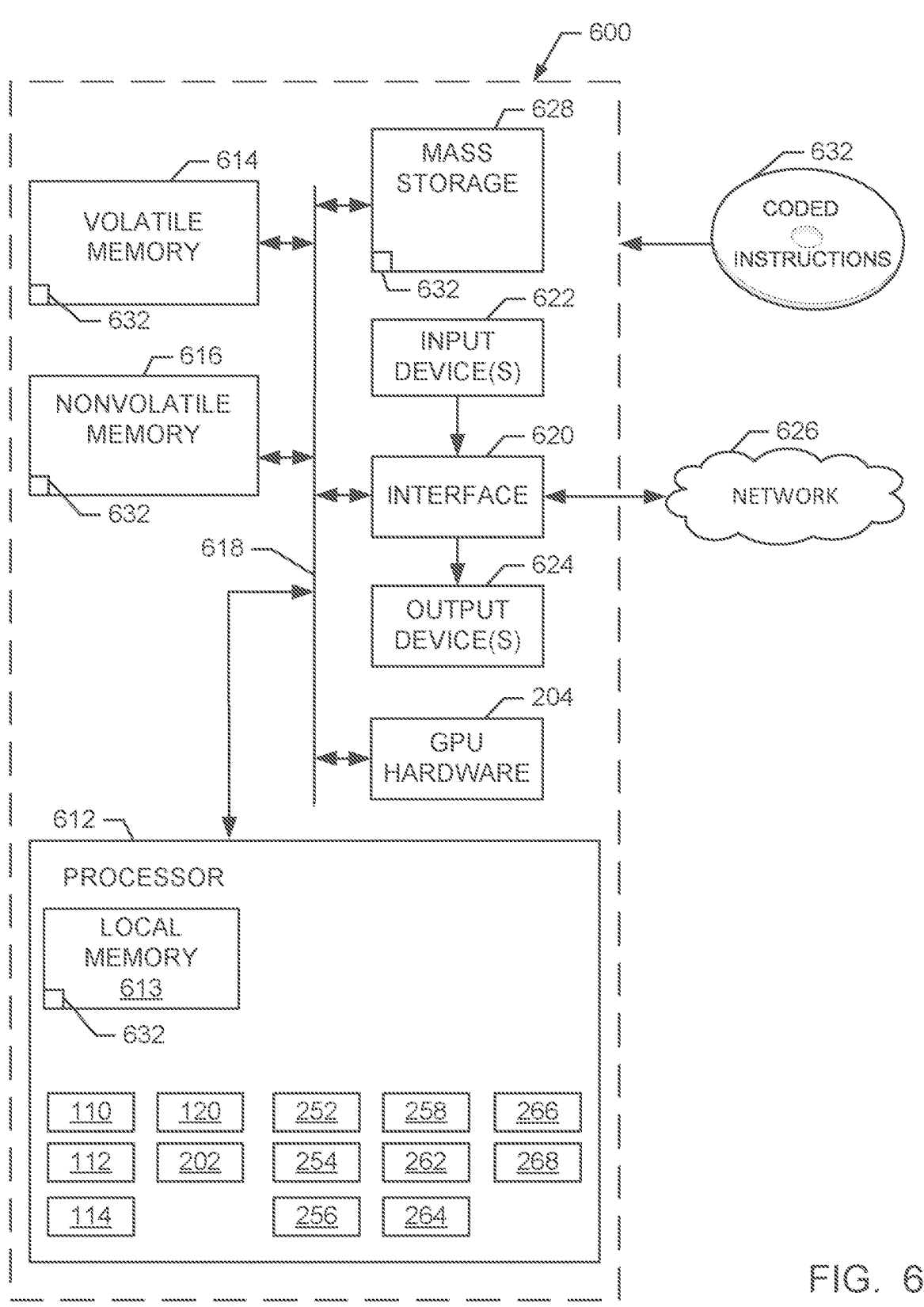
FIG. 6 is a processor platform capable of executing the machine-readable instructions of FIGS. 5A and 5B to implement the instruction-level GPU profiling framework of FIGS. 1 and 2 to perform instruction-level GPU profiling based on binary instrumentation in accordance with the teachings of this disclosure.

In examples disclosed herein, means for executing the GPU driver 120 may be implemented by the example processor 612 of FIG. 6. In examples disclosed herein means for accessing binary code generated by the GPU compiler 202 may be implemented by compiler interface 254. In examples disclosed herein, means for accessing instrumented binary code (e.g., the IBC 124) may be implemented by the instrumentation interface 256. In examples disclosed herein, means for providing the instrumented binary code from the GPU driver 120 to the GPU hardware device 204 may be implemented by the GUP interface 258. In examples disclosed herein, storing means may be implemented by the memory 218. In examples disclosed herein, means for accessing header information may be implemented by the application interface 252, the compiler interface 254, the instrumentation interface 256, and/or the GPU interface 258. For example, the means for accessing header information in the OAC 206 may be implemented by the application interface 252 and/or by the compiler interface 254 to determine (e.g., based on a flag or value in the header information) that the OAC 206 is to be provided to the GPU compiler 206. Additionally or alternatively, the means for accessing header information in the OBC 208 may be implemented by the instrumentation interface 256 to determine (e.g., based on a flag or value in the header information) that the OBC 208 is to be provided to the binary instrumentation module 112. Additionally or alternatively, the means for accessing header information in the IBC 124 may be implemented by the GPU interface 258 to determine (e.g., based on a flag or value in the header information) that the IBC 124 is to be provided to the GPU hardware device 204. In examples disclosed herein, means for providing the OAC 206 from the GPU driver 120 to the GPU compiler 202 may be implemented by the compiler interface 254. In examples disclosed herein, means for providing the binary code from the GPU driver to the binary instrumentation module can be implemented by the instrumentation interface 256. In examples disclosed herein, means for presenting the GPD 216 may be implemented by the profiling application 110. In examples disclosed herein, the profiling application 110 may additionally or alternatively implement profiling means for generating the instrumentation schema 212. In examples disclosed herein, the binary instrumentation module 112 may implement means for determining profiling instruction insertion points and/or may implement means for generating the instrumented binary code.

Figure 5A:
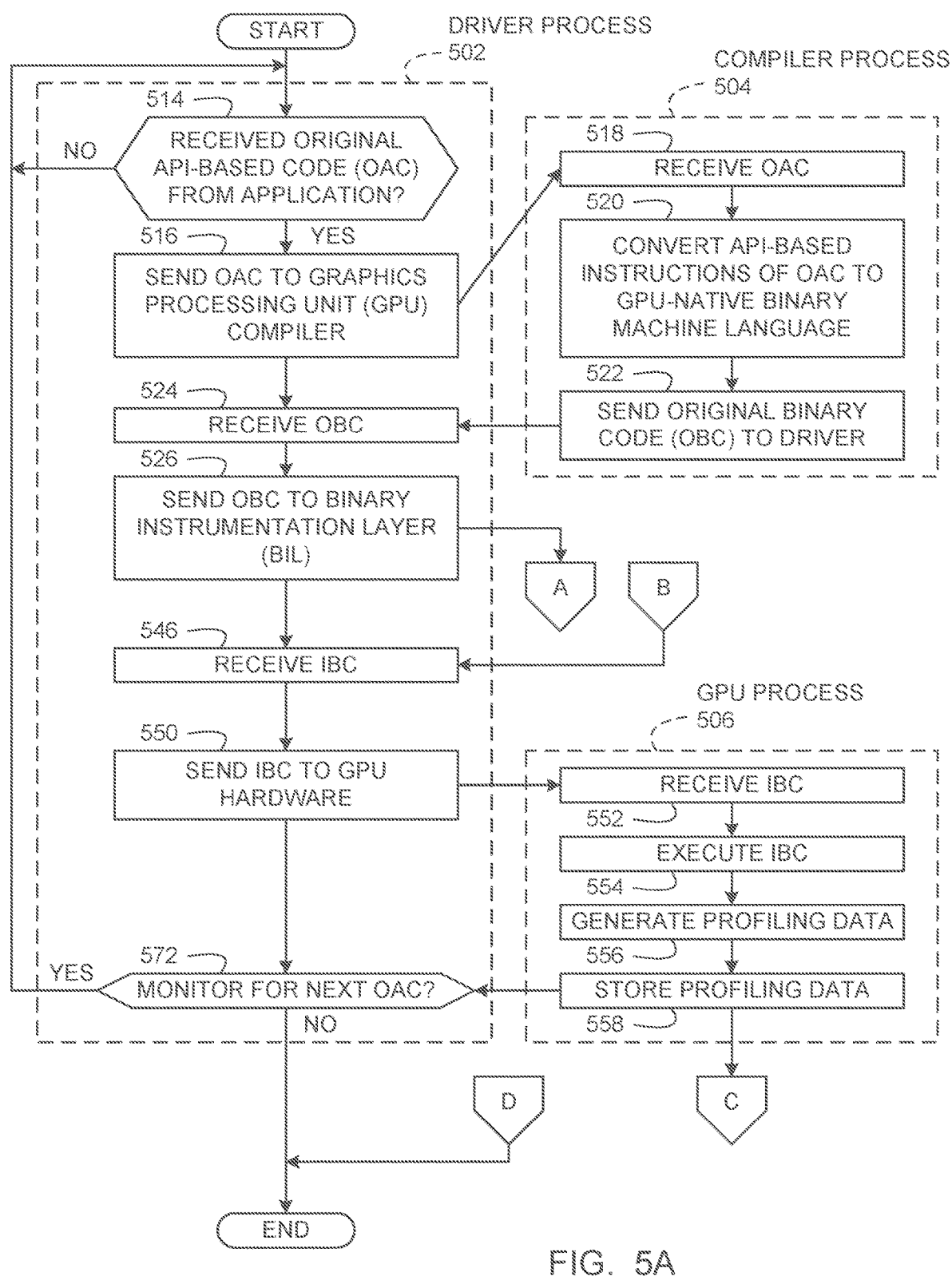
FIGS. 5A and 5B show a flowchart representative of example machine readable instructions that may be executed to implement the instruction-level GPU profiling framework of FIGS. 1 and 2 to perform instruction-level GPU profiling based on binary instrumentation in accordance with the teachings of this disclosure.
Figure 5B:
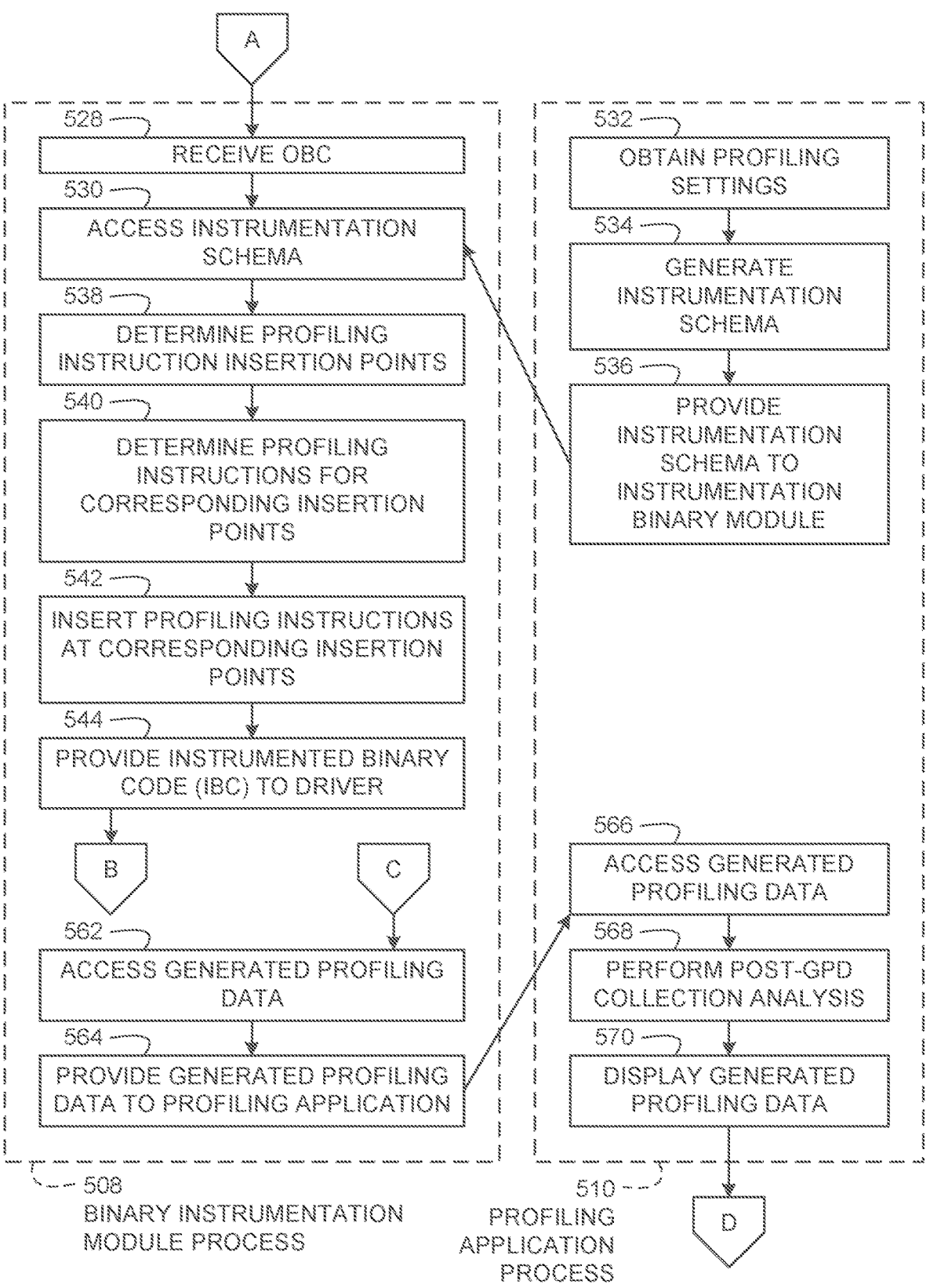

FIGS. 5A and 5B show a flowchart representative of example machine readable instructions that may be executed to implement the instruction-level GPU profiling framework 108, the GPU driver 120, the GPU compiler 202, and/or the GPU hardware device 204 of FIG. 1 and/or FIG. 2 to perform instruction-level GPU profiling based on binary instrumentation. In this example, the machine-readable instructions implement one or more programs for execution by a processor such as the processor 612 shown in the example processor platform 600 discussed below in connection with FIG. 6. The program(s) may be embodied in software stored on a non-transitory computer readable storage medium such as a CD-ROM, a floppy disk, a hard drive, a digital versatile disk (DVD), a Blu-ray disk, or a memory associated with the processor 612, but the entirety(ies) of the program(s) and/or parts thereof could alternatively be executed by a device other than the processor 612 and/or embodied in firmware and/or dedicated hardware. Further, although the example program(s) is/are described with reference to the flowchart illustrated in FIGS. 5A and 5B, many other methods of implementing examples disclosed herein to perform instruction-level GPU profiling based on binary instrumentation may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5A and 5B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program(s) of FIGS. 5A and 5B include an example driver process 502, an example compiler process 504, an example GPU process 506, an example binary instrumentation module process 508, and an example profiling application process 510. The example driver process 502 is representative of machine readable instructions that may be executed to implement the GPU driver 120 (FIGS. 1 and 2). The example compiler process 504 is representative of machine readable instructions that may be executed to implement the GPU compiler 202 (FIG. 2). The example GPU process 506 is representative of machine readable instructions that may be executed to implement the GPU hardware device 204 (FIG. 2). The example binary instrumentation module process 508 is representative of machine readable instructions that may be executed to implement the binary instrumentation module 112 (FIGS. 1 and 2). The example profiling application process 510 is representative of machine readable instructions that may be executed to implement the profiling application 110 (FIGS. 1 and 2).

The program(s) of FIGS. 5A and 5B begin(s) in the example driver process 502 at block 514 (FIG. 5A) at which the example application interface 252 (FIG. 2) determines whether it has received the OAC 206 from the application 114. If the example application interface 252 has received the OAC 206 from the application 114, control advances to block 516 at which the example compiler interface 254 (FIG. 2) provides the OAC 206 to the example GPU compiler 202 (FIG. 2). For example, the compiler interface 254 may identify a flag or value in header information of the OAC 206 indicating that the OAC 206 is source code. As such, in determining that the OAC 206 is source code, the compiler interface 254 determines that it should send the OAC 206 to the GPU compiler 202 (at block 516) so that the GPU compiler 202 can compile the OAC 206.

Turning briefly to the example compiler process 504 of FIG. 5A, the GPU compiler 202 receives the OAC 206 (block 518). For example, the GPU compiler 202 accesses the OAC 206 that was provided by the compiler interface 254 at block 516. The example GPU compiler 202 converts the API-based source code instructions of the OAC 206 to GPU-native binary machine language to generate the OBC 208 (FIG. 2) (block 520). The example GPU compiler 202 provides the OBC 208 to the GPU driver 120 (block 522). Returning to the example driver process 502, the compiler interface 254 receives the OBC 208 from the GPU compiler 202 (block 524). For example, the compiler interface 254 accesses the OBC 208 that was provided by the GPU compiler 202 at block 522. The example instrumentation interface 256 (FIG. 2) provides the OBC 208 to the binary instrumentation module 112 (FIGS. 1 and 2) (block 526). For example, the instrumentation interface 256 may identify a flag or value in header information of the OBC 208 indicating that the OBC 208 is pre-instrumented compiled binary code. As such, in determining that the OBC 208 is pre-instrumented compiled binary code, the instrumentation interface 256 determines that it should send the OBC 208 to the binary instrumentation module 112 (at block 526) so that the binary instrumentation module 112 can instrument the OBC 208 with profiling instructions.

Turning to the example binary instrumentation module process 508 of FIG. 5B, the driver interface 266 (FIG. 2) receives the OBC 208 from the GPU driver 120 (block 528). For example, the driver interface 266 accesses the OBC 208 that was provided by the GPU driver 120 at block 526 of FIG. 5A. The example schema interface 262 (FIG. 2) accesses the instrumentation schema 212 (FIG. 2) (block 530). For example, the schema interface 262 accesses the instrumentation schema 212 that is provided by the profiling application 110. An example of how the profiling application 110 generates and provides the instrumentation schema 212 is shown in the profiling application process 510 of FIG. 5B. Turning briefly to the profiling application process 510, the profiling application 110 obtains profiling settings (block 532). For example, the profiling application 110 can obtain profiling settings from a user via a user interface and/or from an automated source code analysis process. In any case, the profiling settings are indicative of performance parameters that are to be measured for the OAC 206. The profiling application 110 generates the instrumentation schema 212 (block 534). For example, the profiling application 110 generates the instrumentation schema 212 based on the profiling settings obtained at block 532 to indicate performance parameters that are to be measured for the OAC 206. The profiling application 110 provides the instrumentation schema 212 to the instrumentation binary module 112 (block 536). As such, the schema interface 262 can access the instrumentation schema 212 as described above in connection with block 530 of the binary instrumentation module process 508.

Returning to the example binary instrumentation module process 508, the example instruction inserter 264 (FIG. 2) determines profiling instruction insertion points (block 538). The instruction inserter 264 can determine the profiling instruction insertion points in the OBC 208 based on performance parameters and/or profiling instruction insertion statements specified in the instrumentation schema 212. For example, the instrumentation schema 212 may indicate particular lines of code, function calls, routines, variables, etc. of the OAC 206 for which performance parameters are to be profiled and/or at which profiling instructions are to be inserted. Using such information, the instruction inserter 264 can identify insertion points in the OBC 208 corresponding to the ones of the specified lines of code, function calls, routines, variables, etc. The example instruction inserter 264 determines profiling instructions to be inserted at corresponding ones of the insertion points (block 540). In the illustrated example, the instruction inserter 264 selects profiling instructions suitable for generating the performance parameters specified in the instrumentation schema 212. In some examples, instruction insertion statements in the instrumentation schema 212 specify for the instruction inserter 264 what profiling instructions to use. In other examples, the instruction inserter 264 is provided with a profiling instruction look-up table or other type of profiling instruction-reference guide that specifies what types of profiling instructions to use for what types of performance parameters specified in the instrumentation schema 212 to be measured. For example, if GPU clock cycles and invocation counts per instruction are to be measured, the instruction inserter 264 selects profiling instructions such as the instrumented profiling instructions 308 of FIG. 3B. The example instruction inserter 264 inserts the profiling instructions at corresponding ones of the insertion points (block 542). For example, the instruction inserter 264 can generate the IBC 124 as shown in FIG. 3B by inserting the instrumented profiling instructions 308 at insertion points in the OAC 206. The example driver interface 266 provides the IBC 124 (FIG. 2) to the GPU driver 120 (block 544).

Returning to the example driver process 502 of FIG. 5A, the instrumentation interface 256 receives the IBC 124 from the binary instrumentation module 112 (block 546). For example, the instrumentation interface 256 accesses the IBC 124 that was provided by the driver interface 266 of the binary instrumentation module 112 at block 544 of FIG. 5B. The example GPU interface 258 provides the IBC 124 to the GPU hardware device 204 (FIG. 2) (block 550). For example, the GPU interface 258 may identify a flag or value in header information of the IBC 124 indicating that the IBC 124 is instrumented compiled binary code. As such, in determining that the IBC 124 is instrumented compiled binary code, the GPU interface 258 determines that it should send the IBC 124 to the GPU hardware device 204 (at block 550) so that the GPU hardware device 204 can execute the IBC 124.

Turning to the example GPU process 506 of FIG. 5A, the GPU hardware device 204 receives the IBC 124 (block 552). For example, the GPU hardware device 204 receives the IBC 124 that was provided by the GPU interface 258 at block 550. The example GPU hardware device 204 executes the IBC 124 (block 554). The example GPU hardware device 204 generates profiling data (block 556). For example, the GPU hardware device 204 generates the GPD 216 (FIG. 2) based on execution of the IBC 124 (e.g., based on profiling instructions in the IBC 124 such as the instrumented profiling instructions 308 of FIG. 3B). The example GPU hardware device 204 stores the profiling data (block 558). For example, the GPU hardware device 204 stores the GPD 216 at one or more locations of the memory 218 specified in the IBC 124. In some examples, the GPU hardware device 204 stores the GPD 216 in the memory 218 during execution of the IBC 124 such that any accumulated values during execution of the IBC 124 are updated directly in the specified one or more locations of the memory 218. After the GPU hardware device 204 stores the GPD 216, control returns to the example driver process 502 of FIG. 5A and to the example binary instrumentation module process 508 of FIG. 5B.

Returning to the example binary instrumentation module process 508 of FIG. 5B, the example memory interface 268 (FIG. 2) of the binary instrumentation module 112 accesses the GPD 216 (block 562). For example, the memory interface 268 accesses the GPD 216 in the one or more locations of the memory 218 that the instruction inserter 264 specified in the instrumented profiling instructions of the IBC 124. The example memory interface 268 provides the GPD 216 to the profiling application 110 (block 564). Turning briefly to the example profiling application process 510 of FIG. 5B, the profiling application 110 accesses the GPD 216 (block 566). In the illustrated example, the profiling application 110 performs a post-GPD collection analysis on the GPD 216 (block 568). For example, the profiling application 110 can perform the per-instruction GPU clock cycle calculations described above in connection with FIG. 4B and/or any other suitable post-GPD collection analysis. The profiling application 110 presents the GPD 216 and/or any other post-GPD collection analysis data (block 570). For example, the profiling application 110 can display the GPD 216 and/or any other post-GPD collection analysis data via a GUI such as the example performance profile GUI 400 of FIG. 4A for viewing by a user.

Returning to the example driver process 502 of FIG. 5A, the application interface 252 determines whether to monitor for a next OAC 206 from the application 114 (block 572). For example, the application 114 may provide multiple OAC's 206 to implement different graphics processes of the application 114. If the application interface 252 determines that it should monitor for a next OAC 206, control returns to block 514. Otherwise, if the application interface 252 determines that it should not monitor for a next OAC 206 and/or after control returns from block 570 of FIG. 5B, the example process(es) of FIGS. 5A and 5B end.

FIG. 6 is a block diagram of an example processor platform 600 capable of executing the instructions of FIGS. 5A and 5B to implement the instruction-level GPU profiling framework 108, the GPU driver 120, the GPU compiler 202, and/or the GPU hardware device 204 of FIGS. 1 and/or 2 to perform instruction-level GPU profiling based on binary instrumentation. The processor platform 600 can be, for example, a server, a personal computer, a tablet (e.g., an Apple iPad™ tablet), or any other suitable type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor 612 may be a semiconductor based (e.g., silicon based) device. In this example, the processor 612 implements the profiling application 110, binary instrumentation module 112, the application 114, the GPU driver 120 (or the runtime system), the GPU compiler 202, the application interface 252, the compiler interface 254, the instrumentation interface 256, the GPU interface 258, the schema interface 262, the instruction inserter 264, the driver interface 266 266, and the memory interface 268. In the illustrated example, the processor 612 is in circuit with the GPU hardware 204 via a system bus 618.

The processor 612 of the illustrated example includes a local memory 613 (e.g., a cache). The processor 612 of the illustrated example is in communication with a main memory including a volatile memory 614 and a non-volatile memory 616 via the bus 1018. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) 622 can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The memory 218 of FIG. 2 may be implemented by one or more of the local memory 613, the volatile memory 614, the non-volatile memory 616, and/or the mass storage device(s) 628 of FIG. 6. Coded instructions 1032 representative of the machine-readable instructions of FIGS. 5A and 5B may be stored in the mass storage device 628, in the volatile memory 614, in the non-volatile memory 616, and/or on a removable tangible computer readable storage medium such as a CD or DVD.

From the foregoing, it will be appreciated that example methods, apparatus and articles of manufacture have been disclosed that may be used to monitor and assess low-level performance characteristics of graphics processing code (e.g., software and/or firmware) at the instruction level. Unlike techniques for profiling software and/or firmware executed by CPU's, examples disclosed herein enable profiling software and/or firmware executed by GPUs. In addition, unlike techniques for profiling software and/or firmware executed by GPU's that require developers to modify their GPU programs with source code-level profiling instructions that access hardware performance counters, examples disclosed herein do not require developers to customize their source code for profiling. In this manner, a developer may provide an original, non-modified application, and examples disclosed herein may be used to instrument the resulting compiled object code at the machine instruction level based on specified performance parameters (e.g., provided by a user and/or an automated analysis process).

Some embodiments of GPU program profiling techniques based on hardware performance counters and corresponding high-level API calls may result in coarse granularity of collected profiling data and may require modifying the source code based on the high-level API calls. That is, because the resulting profiling information is based on API-level calls and hardware performance counters, the resulting performance profiling data is limited to the granularity of the entire kernel or the GPU program (e.g., a shader GPU program). For example, API-based profiling instructions used to access the hardware performance counters cannot be used to monitor execution performance at a lower level of granularity than high-level API calls that form the GPU program source code. Using such techniques, deeper, more granular insights into the machine-level instructions of the binary code cannot be captured. That is, performance insights (e.g., instruction latencies, control flow executions, instruction frequencies, hotspot detections, etc.) down to executions of specific machine instructions and/or basic blocks of machine instructions cannot be determined using such high-level API-based calls. Examples disclosed herein enable software/firmware developers to identify bottlenecks and detect hotspots in graphics applications (e.g., a DirectX API, an OpenGL API, a Metal API, etc.) and general purpose (GP) GPU compute applications (e.g., an OpenCL API, a CM API, etc.) and other low-level performance insights at machine-level instruction granularity which is a finer granularity than API-level profiling.

Using examples disclosed herein, a user can perform performance analysis of graphics applications or GPGPU applications, and analyze the dynamic behavior of the code running on GPU EUs with finer granularity insights far beyond the coarser granularity performance measures achievable using hardware performance counters. Examples disclosed herein may be advantageously employed by hardware architects inside GPU design and manufacturing companies, and application developers. For example, hardware architects may employ examples disclosed herein for use in driver/compiler development and optimization (e.g., when developing GPU hardware and/or corresponding firmware and/or drivers), and application developers may employ examples disclosed herein to develop graphics applications and/or GPGPU applications.

The following pertain to further examples disclosed herein.

Example 1 is an apparatus to perform instruction-level graphics processing unit (GPU) profiling based on binary instrumentation. The apparatus of Example 1 includes a processor to execute a GPU driver; a compiler interface of the GPU driver to access binary code generated by a GPU compiler based on application programming interface (API)-based code provided by an application; an instrumentation interface of the GPU driver to access instrumented binary code, the instrumented binary code to be generated by a binary instrumentation module by inserting profiling instructions in the binary code based on an instrumentation schema provided by a profiling application; and a GPU interface to provide the instrumented binary code from the GPU driver to a GPU, the instrumented binary code structured to cause the GPU to generate profiling data based on the profiling instructions while executing the instrumented binary code.

In Example 2, the subject matter of Example 1 can optionally include a memory in circuit with the GPU, the GPU to store the profiling data in the memory.

In Example 3, the subject matter of Example 1 can optionally include that, before providing the instrumented binary code to the GPU, the GPU interface is to access header information in the instrumented binary code to determine, based on the header information, that the instrumented binary code is to be provided to the GPU.

In Example 4, the subject matter of Example 1 can optionally include that the compiler interface is to provide the API-based code from the GPU driver to the GPU compiler.

In Example 5, the subject matter of Example 1 can optionally include that the instrumentation interface is to provide the binary code from the GPU driver to the binary instrumentation module.

In Example 6, the subject matter of Example 1 can optionally include a profiling application executed by the processor to present the profiling data via a graphical user interface on a display.

In Example 7, the subject matter of Example 1 can optionally include a profiling application to be executed by the processor to generate the instrumentation schema based on profiling settings; and the binary instrumentation module to be in communication with the profiling application, the binary instrumentation module to: determine profiling instruction insertion points based on the instrumentation schema; and generate the instrumented binary code by inserting the profiling instructions at corresponding ones of the profiling instruction insertion points based on the instrumentation schema.

Example 8 is an apparatus to perform instruction-level graphics processing unit (GPU) profiling based on binary instrumentation. The apparatus of Example 8 includes means for executing a GPU driver; means for accessing binary code generated by a GPU compiler based on application programming interface (API)-based code provided by an application; means for accessing instrumented binary code, the instrumented binary code to be generated by a binary instrumentation module by inserting profiling instructions in the binary code based on an instrumentation schema provided by a profiling application; and means for providing the instrumented binary code from the GPU driver to a GPU, the instrumented binary code structured to cause the GPU to generate profiling data based on the profiling instructions while executing the instrumented binary code.

In Example 9, the subject matter of Example 8 can optionally include storing means in circuit with the GPU, the GPU to store the profiling data in the storing means.

In Example 10, the subject matter of Example 8 can optionally include means for accessing header information to, before providing the instrumented binary code to the GPU, access header information in the instrumented binary code to determine, based on the header information, that the instrumented binary code is to be provided to the GPU.

In Example 11, the subject matter of Example 8 can optionally include means for providing the API-based code from the GPU driver to the GPU compiler.

In Example 12, the subject matter of Example 8 can optionally include means for providing the binary code from the GPU driver to the binary instrumentation module.

In Example 13, the subject matter of Example 8 can optionally include profiling means for presenting the profiling data via a graphical user interface on a display.

In Example 14, the subject matter of Example 8 can optionally include profiling means for generating the instrumentation schema based on profiling settings; means for determining profiling instruction insertion points based on the instrumentation schema; and means for generating the instrumented binary code by inserting the profiling instructions at corresponding ones of the profiling instruction insertion points based on the instrumentation schema.

Example 15 is a non-transitory computer readable medium comprising instructions that, when executed, cause at least one processor to at least: access, via a graphics processing unit (GPU) driver, binary code generated by a GPU compiler based on application programming interface (API)-based code provided by an application; access, via the GPU driver, instrumented binary code, the instrumented binary code generated by a binary instrumentation module that inserts profiling instructions in the binary code based on an instrumentation schema provided by a profiling application; and provide, via the GPU driver, the instrumented binary code from the GPU driver to a GPU, the instrumented binary code structured to cause the GPU to collect and store profiling data in a memory based on the profiling instructions while executing the instrumented binary code.

In Example 16, the subject matter of Example 15 can optionally include that the instructions are further to cause the at least one processor to, before providing the instrumented binary code to the GPU, access header information in the instrumented binary code to determine, based on the header information, that the instrumented binary code is to be provided to the GPU.

In Example 17, the subject matter of Example 15 can optionally include that the instructions are further to cause the at least one processor to provide the API-based code from the GPU driver to the GPU compiler.

In Example 18, the subject matter of Example 15 can optionally include that the instructions are further to cause the at least one processor to provide the binary code from the GPU driver to the binary instrumentation module.

In Example 19, the subject matter of Example 15 can optionally include that the instructions are further to cause the at least one processor to present the profiling data via a graphical user interface on a display.

In Example 20, the subject matter of Example 15 can optionally include that the instructions are further to cause the at least one processor to: generate the instrumentation schema based on profiling settings; determine profiling instruction insertion points based on the instrumentation schema; and generate the instrumented binary code by inserting the profiling instructions at corresponding ones of the profiling instruction insertion points based on the instrumentation schema.

Example 21 is a method to perform instruction-level graphics processing unit (GPU) profiling based on binary instrumentation. The method of Example 21 includes accessing, via a GPU driver executed by a processor, binary code generated by a GPU compiler based on application programming interface (API)-based code provided by an application; accessing, via the GPU driver executed by the processor, instrumented binary code, the instrumented binary code generated by a binary instrumentation module that inserts profiling instructions in the binary code based on an instrumentation schema provided by a profiling application; and providing, via the GPU driver executed by the processor, the instrumented binary code from the GPU driver to a GPU, the instrumented binary code structured to cause the GPU to collect and store profiling data in a memory based on the profiling instructions while executing the instrumented binary code.

In Example 22, the subject matter of Example 21 can optionally include, before providing the instrumented binary code to the GPU, accessing header information in the instrumented binary code to determine, based on the header information, that the instrumented binary code is to be provided to the GPU.

In Example 23, the subject matter of Example 21 can optionally include providing the API-based code from the GPU driver to the GPU compiler.

In Example 24, the subject matter of Example 21 can optionally include providing the binary code from the GPU driver to the binary instrumentation module.

In Example 25, the subject matter of Example 21 can optionally include presenting the profiling data via a graphical user interface on a display.

In Example 26, the subject matter of Example 21 can optionally include generating the instrumentation schema based on profiling settings; determining profiling instruction insertion points based on the instrumentation schema; and generating the instrumented binary code by inserting the profiling instructions at corresponding ones of the profiling instruction insertion points based on the instrumentation schema.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
interface circuitry;
machine-readable instructions; and
at least one first programmable circuit to be programmed by the machine-readable instructions to:
access an instrumentation schema, the instrumentation schema generated by a profiling application based on compiled binary code, the instrumentation schema to identify points in the compiled binary code, the profiling application separate from a compiler that generated the compiled binary code;
generate instrumented code by:
inserting profiling instructions at the points in the compiled binary code identified by the instrumentation schema;
inserting a memory allocation profiling instruction in the compiled binary code, the memory allocation profiling instruction to cause at least one second programmable circuit to allocate memory space at a location of memory accessible by one or more of the at least one second programmable circuit and by one or more of the at least one first programmable circuit; and
specifying an address of the location of the memory in the compiled binary code, the location at the address to store profiling data, the profiling data to be generated by the one or more of the at least one second programmable circuit based on the instrumented code;

communicate the instrumented code to a runtime system to cause execution of the instrumented code by the one or more of the at least one second programmable circuit; and
access the profiling data, generated by the one or more of the at least one second programmable circuit, at the location in the memory accessible by the one or more of the at least one second programmable circuit and by the one or more of the at least one first programmable circuit.

2. The system of claim 1, wherein the one or more of the at least one first programmable circuit is to generate the instrumented code based on an instruction insertion statement in the instrumentation schema, the instruction insertion statement specifying a counter start read profiling instruction to be inserted at a first one of the points before a first machine instruction in the compiled binary code and specifying a counter end read profiling instruction to be inserted at a second one of the points after a second machine instruction in the compiled binary code.

3. The system of claim 2, wherein the profiling data includes an execution duration of a code sequence bounded by the counter start read profiling instruction and the counter end read profiling instruction in the instrumented code.

4. The system of claim 1, wherein the profiling data includes a measurement of a performance parameter, the one or more of the at least one first programmable circuit to select ones of the profiling instructions by referencing the performance parameter in a look-up table that associates the ones of the profiling instructions with the performance parameter.

5. The system of claim 1, wherein the one or more of the at least one first programmable circuit is to access the compiled binary code from a graphics processing unit driver before generating the instrumented code.

6. The system of claim 1, wherein the one or more of the at least one first programmable circuit is to insert the profiling instructions in the compiled binary code based on application programming interface-based user-specified performance profiling parameters in the instrumentation schema.

7. A non-transitory computer readable medium comprising instructions to cause at least one first programmable circuit to at least:
access an instrumentation schema, the instrumentation schema generated by a profiling application based on compiled binary code, the instrumentation schema to specify insertion points in the compiled binary code;
generate instrumented code by:
inserting profiling instructions at respective ones of the insertion points in the compiled binary code specified by the instrumentation schema;
inserting a memory allocation profiling instruction in the compiled binary code, the memory allocation profiling instruction to cause at least one second programmable circuit to allocate memory space at a location of memory accessible by one or more of the at least one second programmable circuit and by one or more of the at least one first programmable circuit; and
specifying an address of the location of the memory in the compiled binary code, the location at the address to store profiling data, the profiling data to be generated by the one or more of the at least one second programmable circuit based on the instrumented code;

communicate the instrumented code to a runtime system to cause execution of the instrumented code by the one or more of the at least one second programmable circuit; and access the profiling data, generated by the one or more of the at least one second programmable circuit, at the location in the memory accessible by the one or more of the at least one second programmable circuit and by the one or more of the at least one first programmable circuit.

8. The non-transitory computer readable medium as defined in claim 7, wherein the instructions are to cause the one or more of the at least one first programmable circuit to generate the instrumented code based on an instruction insertion statement in the instrumentation schema, the instruction insertion statement specifying a counter start read profiling instruction to be inserted at a first one of the insertion points before a first machine instruction in the compiled binary code and specifying a counter end read profiling instruction to be inserted at a second one of the insertion points after a second machine instruction in the compiled binary code.

9. The non-transitory computer readable medium as defined in claim 8, wherein the profiling data includes an execution duration of a code sequence bounded by the counter start read profiling instruction and the counter end read profiling instruction in the instrumented code.

10. The non-transitory computer readable medium as defined in claim 7, wherein the profiling data includes a measurement of a performance parameter, the instructions to cause the one or more of the at least one first programmable circuit to select ones of the profiling instructions by referencing the performance parameter in a look-up table.

11. The non-transitory computer readable medium as defined in claim 7, wherein the instructions are to cause the one or more of the at least one first programmable circuit to access the compiled binary code from a graphics processing unit driver before generating the instrumented code.

12. The non-transitory computer readable medium as defined in claim 7, wherein the instructions are to cause the one or more of the at least one first programmable circuit to insert the profiling instructions in the compiled binary code based on application programming interface-based user-specified performance profiling parameters in the instrumentation schema.

13. An apparatus comprising:
interface circuitry to access an instrumentation schema, the instrumentation schema generated by a profiling application based on compiled binary code, the instrumentation schema to identify points in the compiled binary code, the profiling application separate from a compiler that generated the compiled binary code; and
at least one first programmable circuitry to execute binary instrumentation instructions to:
generate instrumented code by:
inserting profiling instructions at respective ones of the points in the compiled binary code based on the instrumentation schema;

inserting a memory allocation profiling instruction in the compiled binary code, the memory allocation profiling instruction to cause at least one second programmable circuitry to allocate memory space at a location of memory accessible by one or more of the at least one second programmable circuitry and by one or more of the at least the first programmable circuitry; and
specifying an address of the location of the memory in the compiled binary code, the location at the address to store profiling data, the profiling data to be generated by the one or more of the at least one second programmable circuitry based on the instrumented code; and
access the profiling data, generated by the one or more of the at least the second programmable circuitry, at the location in the memory accessible by the one or more of the at least one second programmable circuitry and by the one or more of the at least the first programmable circuitry.

14. The apparatus of claim 13, wherein one or more of the at least one first programmable circuitry is to generate the instrumented code based on an instruction insertion statement in the instrumentation schema, the instruction insertion statement specifying a counter start read profiling instruction to be inserted at a first one of the points before a first machine instruction in the compiled binary code and specifying a counter end read profiling instruction to be inserted at a second one of the points after a second machine instruction in the compiled binary code.

15. The apparatus of claim 14, wherein the profiling data includes an execution duration of a code sequence bounded by the counter start read profiling instruction and the counter end read profiling instruction in the instrumented code.

16. The apparatus of claim 13, wherein the profiling data includes a measurement of a performance parameter, one or more of the at least one first programmable circuitry is to select ones of the profiling instructions by referencing the performance parameter in a look-up table that associates the ones of the profiling instructions with the performance parameter.

17. The apparatus of claim 13, wherein one or more of the at least one first programmable circuitry is to access the compiled binary code from a graphics processing unit driver before generating the instrumented code.

18. The apparatus of claim 13, wherein the compiler and the profiling application are implemented by the one or more of the at least one first programmable circuitry.

19. The apparatus of claim 18, wherein the at least one first programmable circuitry includes a central processor unit (CPU) and the at least one second programmable circuitry includes a graphics processor unit (GPU).

20. The apparatus of claim 13, wherein one or more of the at least one first programmable circuitry is to insert the profiling instructions in the compiled binary code based on application programming interface-based user-specified performance profiling parameters in the instrumentation schema.

* * * * *